US007911526B2

(12) United States Patent
Kageyama

(10) Patent No.: US 7,911,526 B2
(45) Date of Patent: Mar. 22, 2011

(54) AUTOMATIC FOCUSING APPARATUS AND OPTICAL DEVICE

(75) Inventor: Yasuhiro Kageyama, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 247 days.

(21) Appl. No.: 11/921,652

(22) PCT Filed: Mar. 9, 2007

(86) PCT No.: PCT/JP2007/055301
§ 371 (c)(1),
(2), (4) Date: Dec. 6, 2007

(87) PCT Pub. No.: WO2007/105804
PCT Pub. Date: Sep. 20, 2007

(65) Prior Publication Data
US 2010/0194970 A1    Aug. 5, 2010

(30) Foreign Application Priority Data

Mar. 13, 2006   (JP) .................................. 2006-067377

(51) Int. Cl.
*H04N 5/232* (2006.01)
(52) U.S. Cl. ....................................................... 348/349
(58) Field of Classification Search ................... 348/349
See application file for complete search history.

(56) References Cited

U.S. PATENT DOCUMENTS

| | | | | |
|---|---|---|---|---|
| 4,572,616 A | * | 2/1986 | Kowel et al. | 349/200 |
| 4,795,248 A | * | 1/1989 | Okada et al. | 351/158 |
| 4,904,063 A | * | 2/1990 | Okada et al. | 349/200 |
| 5,097,352 A | * | 3/1992 | Takahashi et al. | 349/57 |

(Continued)

FOREIGN PATENT DOCUMENTS

JP    61-140908    6/1986

(Continued)

OTHER PUBLICATIONS

Supplementary European Search Report dated Dec. 1, 2010 issued in corresponding European Application No. 07738748.8 - 2217.

*Primary Examiner* — James M Hannett
(74) *Attorney, Agent, or Firm* — Finnegan, Henderson, Farabow, Garrett & Dunner, L.L.P.

(57) ABSTRACT

The present invention is directed to the provision of an automatic focusing apparatus that can detect a focusing point at a sufficiently high speed for practical use and can achieve a lens condition having good focusing performance. The automatic focusing apparatus of the present invention includes a liquid crystal lens which forms a refractive index profile, an optical-to-electrical conversion unit which converts an optical image focused through the liquid crystal lens into an electrical signal and outputs the electrical signal as an image signal, a focus signal extracting unit which causes the refractive index profile to change by applying a first range of voltage to the liquid crystal lens, and extracts a plurality of focus signals based on the image signal, a focusing point identifying unit which identifies a focus signal corresponding to a focusing point from among the plurality of extracted focus signals, and a focusing point adjusting unit which adjusts the focusing point by applying to the liquid crystal lens a second voltage that is capable of generating the refractive index profile corresponding to the focus signal identified by the focusing point identifying unit and that is smaller than the first range of voltage applied to the liquid crystal lens in order to obtain the focus signal identified by the focusing point identifying unit.

14 Claims, 15 Drawing Sheets

U.S. PATENT DOCUMENTS

| | | | |
|---|---|---|---|
| 6,130,417 A | 10/2000 | Hashimoto | |
| 6,191,881 B1 * | 2/2001 | Tajima | 359/254 |
| 7,079,203 B1 * | 7/2006 | Huang et al. | 349/95 |
| 7,404,636 B2 * | 7/2008 | Blum et al. | 351/159 |
| 7,425,066 B2 * | 9/2008 | Blum et al. | 351/159 |
| 7,440,193 B2 * | 10/2008 | Gunasekaran et al. | 359/666 |
| 2004/0051833 A1 | 3/2004 | Hain et al. | |
| 2005/0157409 A1 * | 7/2005 | Nishioka | 359/726 |
| 2005/0243237 A1 | 11/2005 | Sasuga | |
| 2006/0050412 A1 * | 3/2006 | Ito et al. | 359/745 |
| 2006/0171696 A1 * | 8/2006 | Murata et al. | 396/72 |
| 2009/0086331 A1 * | 4/2009 | Gunasekaran et al. | 359/666 |

FOREIGN PATENT DOCUMENTS

| | | |
|---|---|---|
| JP | 61-156228 | 7/1986 |
| JP | 62-36632 | 2/1987 |
| JP | 5-53089 | 3/1993 |
| JP | 2000-81562 | 3/2000 |
| JP | 2001-154085 | 6/2001 |
| JP | 2002-122784 | 4/2002 |
| JP | 2002-228816 | 8/2002 |
| JP | 2004-191893 | 7/2004 |
| JP | 2005-92009 | 4/2005 |
| JP | 2005-345520 | 12/2005 |
| WO | WO 2006-054562 | 5/2006 |

* cited by examiner

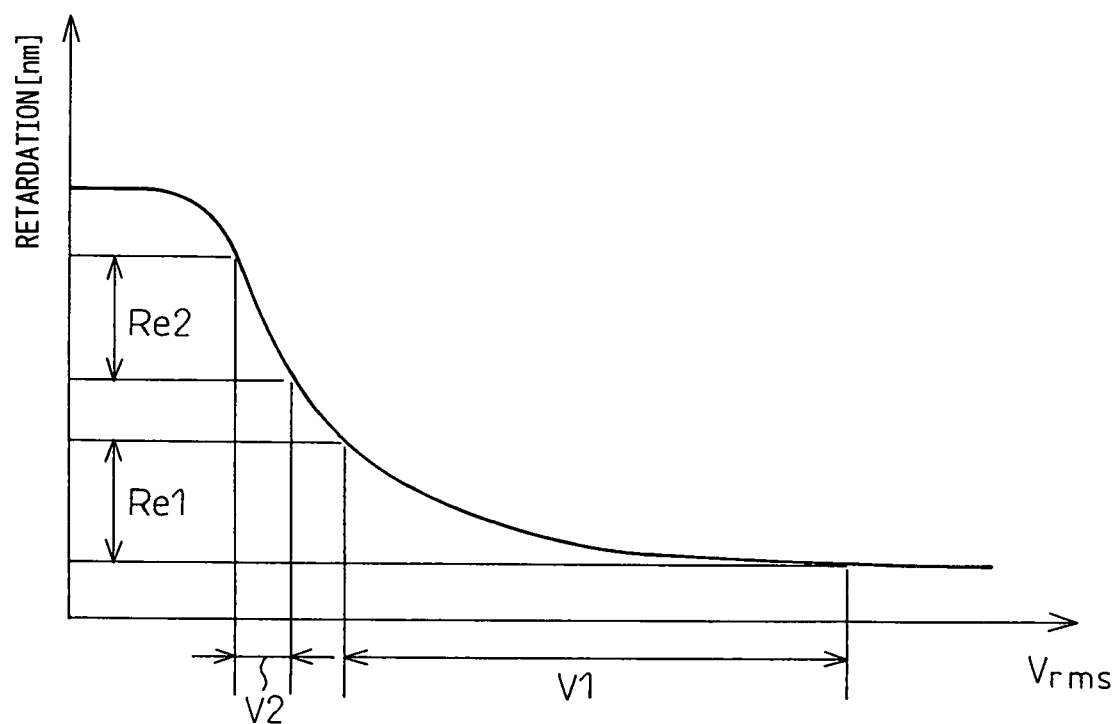

AUTOMATIC FOCUSING APPARATUS AND OPTICAL DEVICE

FIELD OF THE INVENTION

The present invention relates to an automatic focusing apparatus and an optical device. More specifically, the invention relates to an automatic focusing apparatus that uses a liquid crystal lens for adjustment of focal length, extracts a plurality of focus signals corresponding to the degree of focusing from an image signal obtained from an optical image focused through the liquid crystal lens, and detects a focusing point by detecting the peak value of the plurality of focus signals, and the invention also relates to an optical device for use in the same.

BACKGROUND OF THE INVENTION

A method that achieves focusing by moving a lens or lenses is widely employed to implement a focusing system for varying the focal length or focus position of an optical system. However, this method requires the use of a lens driving mechanism, and therefore has the drawbacks that the focusing system is complex, and that a relatively large amount of power is required to drive the lens driving motor. A further drawback is that impact resistance is generally low. In view of this, as a focusing system that does not require the use of a lens driving mechanism, there is proposed a system that achieves focusing by varying the refractive index of a liquid crystal lens (for example, refer to Patent Document 1).

On the other hand, a contour detection method, which extracts information corresponding to an image out-of-focus condition directly from the captured video image, and controls the lens to minimize the out-of-focus condition by using a hill climbing method, is known for implementing an autofocus (automatic focusing) system for a video camera. Various kinds of autofocus apparatus using such a hill climbing control method are proposed (for example, refer to Patent Documents 2, 3, 4, and 5).

Patent Document 1: Japanese Patent No. 3047082 (Pages 3 to 5, FIGS. 1 to 4)

Patent Document 2: Japanese Utility Patent Publication No. H02-44248 (Pages 4 to 10, FIGS. 7 to 11)

Patent Document 3: Japanese Patent No. 2742741 (Pages 1 and 2, FIGS. 5 to 7)

Patent Document 4: Japanese Examined Patent Publication No. H01-15188 (Pages 1 to 3, FIGS. 1 to 5)

Patent Document 5: Japanese Examined Patent Publication No. H02-11068 (Pages 3 to 5, FIGS. 1 to 3)

SUMMARY OF THE INVENTION

However, the liquid crystal lens has the problem that it takes an appreciable amount of time to detect a focusing point, because the response speed of the liquid crystal is slow. On the other hand, the liquid crystal has the characteristic that when high voltage is applied to the liquid crystal, the response speed increases and the focusing point can be detected in a short amount of time. However, in the presence of a high voltage, the image focusing performance of the liquid crystal lens degrades.

It is an object of the present invention to provide an automatic focusing apparatus and an optical device that solve the above-described problems associated with the prior art.

It is another object of the present invention to provide an automatic focusing apparatus and an optical device that can detect a focusing point at a sufficiently high speed and can achieve a lens condition having a good focusing performance, by making provisions to reduce the voltage applied to the liquid crystal lens when adjusting the focusing point compared with the voltage applied to the liquid crystal lens when extracting a plurality of focus signals corresponding to the degree of focusing.

An automatic focusing apparatus according to the present invention includes a liquid crystal lens which forms a refractive index profile, an optical-to-electrical conversion unit which converts an optical image focused through the liquid crystal lens into an electrical signal and outputs the electrical signal as an image signal, a focus signal extracting unit which causes the refractive index profile to change by applying a first range of voltage to the liquid crystal lens, and extracts a plurality of focus signals based on the image signal, a focusing point identifying unit which identifies a focus signal corresponding to a focusing point from among the plurality of extracted focus signals, and a focusing point adjusting unit which adjusts the focusing point by applying to the liquid crystal lens a second voltage that is capable of generating the refractive index profile corresponding to the focus signal identified by the focusing point identifying unit and that is smaller than the first range of voltage applied to the liquid crystal lens in order to obtain the focus signal identified by the focusing point identifying unit.

Preferably, the automatic focusing apparatus according to the present invention further includes a storage unit which stores the first range of voltage and the second voltage corresponding to each individual voltage in the first range of voltage by establishing an association therebetween.

Preferably, in the automatic focusing apparatus according to the present invention, the first range of voltage includes a plurality of voltages prespecified for each preset focal length.

Preferably, in the automatic focusing apparatus according to the present invention, the focus signal extracting unit acquires the focus signal for every preset focal length.

Preferably, in the automatic focusing apparatus according to the present invention, the focus signal extracting unit includes a previously detected focus signal corresponding to a first focal length with a currently detected focus signal corresponding to a second focal length to check whether the focus signal has increased or decreased, and then proceeds to extract a focus signal corresponding to a third focal length, thereby successively comparing one focus signal with the next, and when the focus signal corresponding to the focusing point is identified by the focusing point identifying unit, the extraction of the focus signals is stopped.

Preferably, the automatic focusing apparatus according to the present invention further includes a switching voltage applying unit which, prior to applying the second voltage, applies to the liquid crystal lens a switching voltage whose potential difference is greater than the second voltage.

Preferably, in the automatic focusing apparatus according to the present invention, the storage unit stores the first range of voltage, the second voltage corresponding to each individual voltage in the first range of voltage, and the switching voltage corresponding to each individual voltage in the first range of voltage and to the second voltage by establishing an association therebetween.

Preferably, the automatic focusing apparatus according to the present invention further includes a temperature detection unit for detecting temperature near the liquid crystal lens.

Preferably, in the automatic focusing apparatus according to the present invention, the focus signal extracting unit causes the refractive index profile to change by applying the first range of voltage to the liquid crystal lens based on the temperature detected by the temperature detection unit, and extracts the plurality of focus signals based on the image signal, and the focusing point adjusting unit, based on the temperature detected by the temperature detection unit, applies to the liquid crystal lens the second voltage that is capable of generating the refractive index profile corresponding to the focus signal identified by the focusing point identifying unit and that is smaller than the first range of voltage applied to the liquid crystal lens in order to obtain the focus signal identified by the focusing point identifying unit.

Preferably, in the automatic focusing apparatus according to the present invention, the storage unit stores the first range of voltage and the second voltage corresponding to each individual voltage in the first range of voltage by establishing an association therebetween for each designated temperature.

Preferably, in the automatic focusing apparatus according to the present invention, the focus signal extracting unit causes the refractive index profile to change by applying the first range of voltage to the liquid crystal lens based on the temperature detected by the temperature detection unit, and extracts the plurality of focus signals based on the image signal, the focusing point adjusting unit, based on the temperature detected by the temperature detection unit, applies to the liquid crystal lens the second voltage that is capable of generating the refractive index profile corresponding to the focus signal identified by the focusing point identifying unit and that is smaller than the first range of voltage applied to the liquid crystal lens in order to obtain the focus signal identified by the focusing point identifying unit, and prior to the application of the second voltage, the switching voltage application unit, based on the temperature detected by the temperature detection unit, applies to the liquid crystal lens the switching voltage whose potential difference is greater than the second voltage.

Preferably, in the automatic focusing apparatus according to the present invention, the storage unit stores the first range of voltage, the second voltage corresponding to each individual voltage in the first range of voltage, and the switching voltage corresponding to the individual voltage in the first range of voltage and to the second voltage by establishing an association therebetween for each designated temperature.

Preferably, in the automatic focusing apparatus according to the present invention, the liquid crystal lens comprises a plurality of ring-shaped zones and a liquid crystal layer.

Preferably, the automatic focusing apparatus according to the present invention further includes an optical lens cooperating with the liquid crystal lens.

An optical device according to the present invention includes a liquid crystal lens which forms a refractive index profile, a focus signal extracting unit which causes the refractive index profile to change by applying a first range of voltage to the liquid crystal lens, and extracts a plurality of focus signals based on the image signal, a focusing point identifying unit which identifies a focus signal corresponding to a focusing point from among the plurality of extracted focus signals, and a focusing point adjusting unit which adjusts the focusing point by applying to the liquid crystal lens a second voltage that is capable of generating the refractive index profile corresponding to the focus signal identified by the focusing point identifying unit and that is smaller than the first range of voltage applied to the liquid crystal lens in order to obtain the focus signal identified by the focusing point identifying unit.

An automatic focusing apparatus according to the present invention includes optical lens means including a liquid crystal lens, optical-to-electrical converting means for converting an optical image focused through the optical lens means into an electrical signal, and for outputting the electrical signal as an image signal; and a liquid crystal lens control unit which extracts a focus signal corresponding to the degree of focusing from the image signal, and controls liquid crystal lens driving conditions so that the focus signal becomes maximum, wherein the liquid crystal lens control unit includes a focus signal extracting unit which extracts a plurality of focus signals by sampling at a prescribed frequency while varying the refractive index by applying a first voltage to the liquid crystal lens, a focusing point identifying unit which identifies a focus signal providing a maximum value from among the plurality of focus signals extracted by the focus signal extracting unit, and a focusing point adjusting unit which adjusts focusing point by applying a second voltage that is smaller than the first voltage and that is capable of generating the refractive index profile corresponding to the focus signal identified by the focusing point identifying unit as the focus signal providing the maximum value.

Preferably, in the automatic focusing apparatus according to the present invention, the correspondence table in the storage unit is provided for each preset focal length.

According to the present invention, by making provisions to reduce the voltage applied to the liquid crystal lens when adjusting the focusing point compared with the voltage applied to the liquid crystal lens when extracting the plurality of focus signals corresponding to the degree of focusing, there is offered the advantageous effect of being able to achieve an automatic focusing apparatus and an optical device that can detect a focusing point at a sufficiently high speed for practical use and can achieve a lens condition having a good focusing performance.

BRIEF DESCRIPTION OF THE DRAWING

FIG. 6 is a diagram showing the relationship between applied voltage to the liquid crystal and retardation.

DETAILED DESCRIPTION OF THE PREFERRED EMBODIMENT

The preferred embodiments of automatic focusing apparatus according to the present invention will be described in detail below with reference to the drawings. However, it should be noted that the present invention is not limited by the description given herein, but covers the inventions described in the appended claims and their equivalents.

Figure 1:
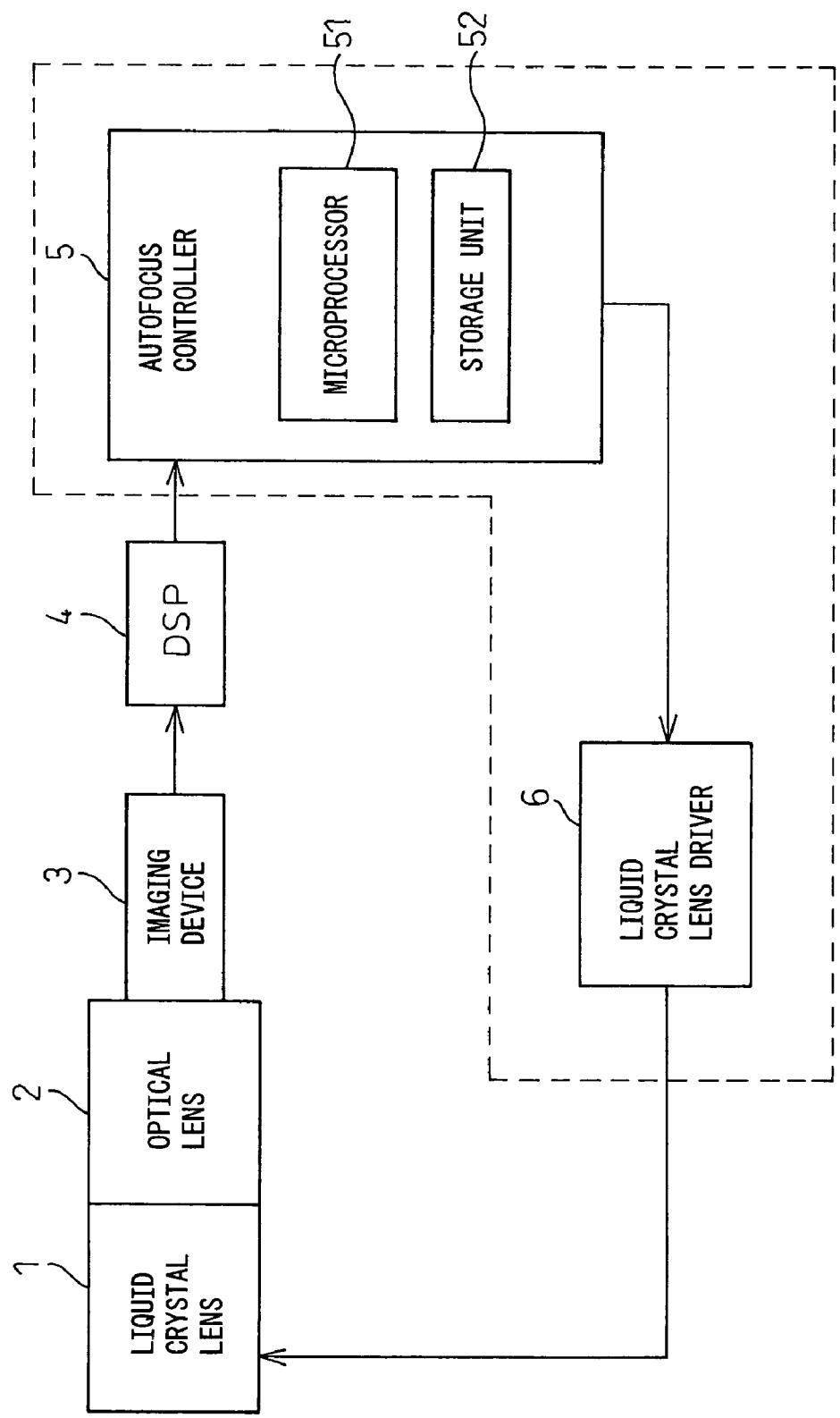
FIG. 1 is a block diagram showing the basic configuration of an automatic focusing apparatus according to the present invention.

FIG. 1 is a block diagram showing the basic configuration of an automatic focusing apparatus according to the present invention.

As shown in FIG. 1, the automatic focusing apparatus of the present invention comprises a liquid crystal lens 1, an optical lens 2, an imaging device 3, a DSP (Digital Signal Processor) 4, an autofocus controller 5, and a liquid crystal lens driver 6. Liquid crystal lens 1 is constructed by combining a liquid crystal lens for P waves with a liquid crystal lens for S waves. Optical lens 2 comprises a diaphragm, a group of pan focus lens elements, and an infrared cutoff filter. Imaging device 3 comprises an image sensor constructed from a solid-state imaging device, such as a CCD or CMOS imager, and an analog-digital converter.

The optical image focused through the liquid crystal lens 1 and optical lens 2 is converted into an electrical signal by the image sensor in imaging device 3. The electrical signal output from the image sensor is converted into a digital signal by the analog-digital converter. DSP 4 performs image processing on the digital signal output from the analog-digital converter. Autofocus controller 5 extracts a plurality of focus signals corresponding to the degree of focusing by sampling the image signal at a prescribed frequency as it is output from the DSP 4. Then, based on the plurality of focus signals thus extracted, the autofocus controller 5 identifies the point at which the focus signal level becomes maximum and, based on the identified result, controls the driving of the liquid crystal lens 1 by means of the liquid crystal lens driver 6.

The autofocus controller 5 includes a microprocessor 51 which performs the above sequence of control operations and a storage unit 52. The storage unit 52 includes a read-only memory area (ROM area) which stores programs to be executed by the microprocessor 51, various relations necessary for obtaining optimum drive voltages, etc., and a writable memory area (RAM area) which the microprocessor 51 uses as a work area. The liquid crystal lens driver 6 applies a voltage to the liquid crystal lens 1 based on a control signal received from the autofocus controller 5.

The liquid crystal lens 1 and the optical lens 2 cooperating with the liquid crystal lens 1 correspond to optical lens means. The imaging device 3 and DSP 4 together correspond to optical-to-electrical converting means. The autofocus controller 5 and liquid crystal lens driver 6 together correspond to a liquid crystal lens control unit or to a focus signal extracting unit, focusing point identifying unit, focusing point adjusting unit, switching voltage application unit, etc. which will be described in detail later.

Figure 2:
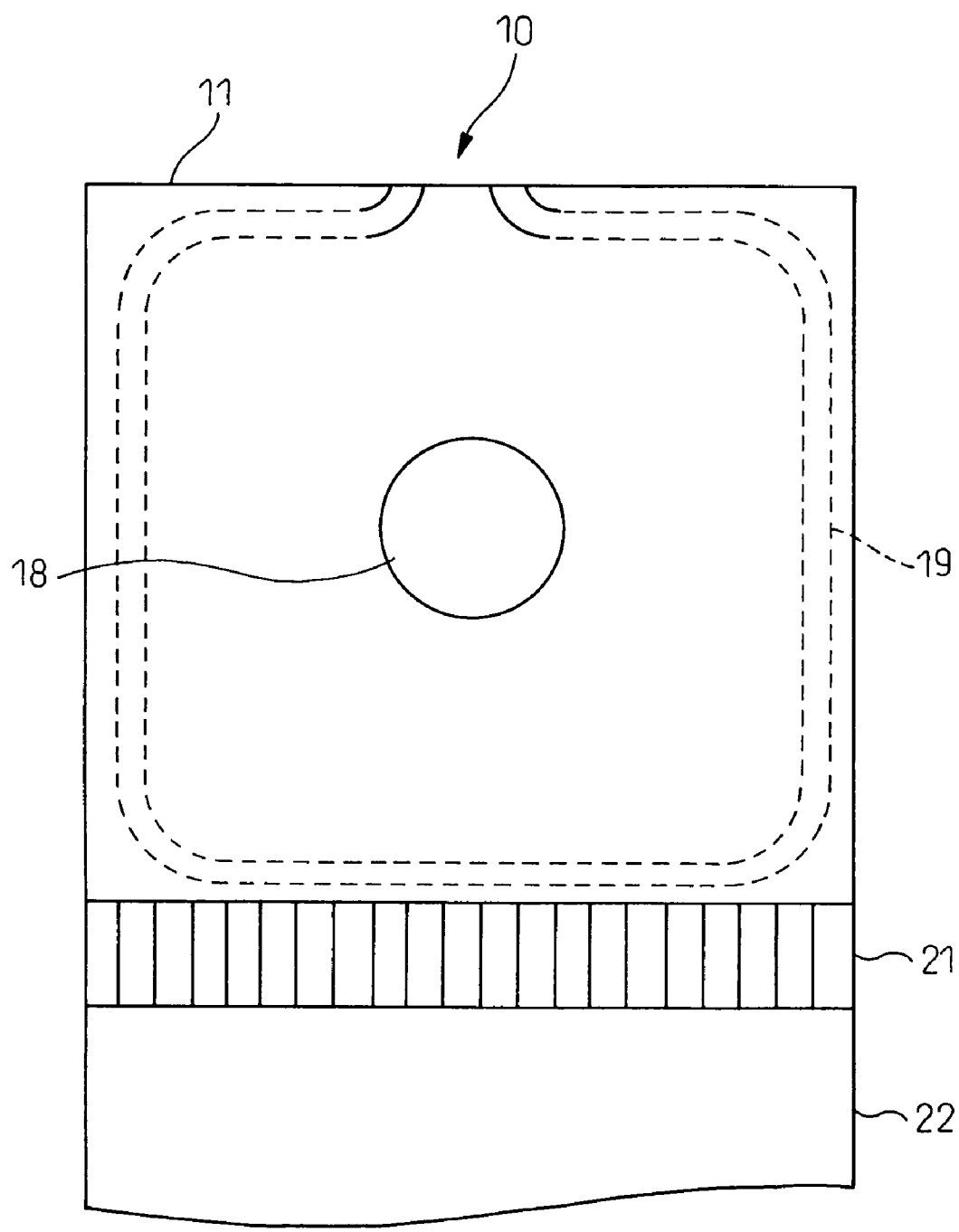
FIG. 2 is a front view showing the structure of a liquid crystal lens.
Figure 3:
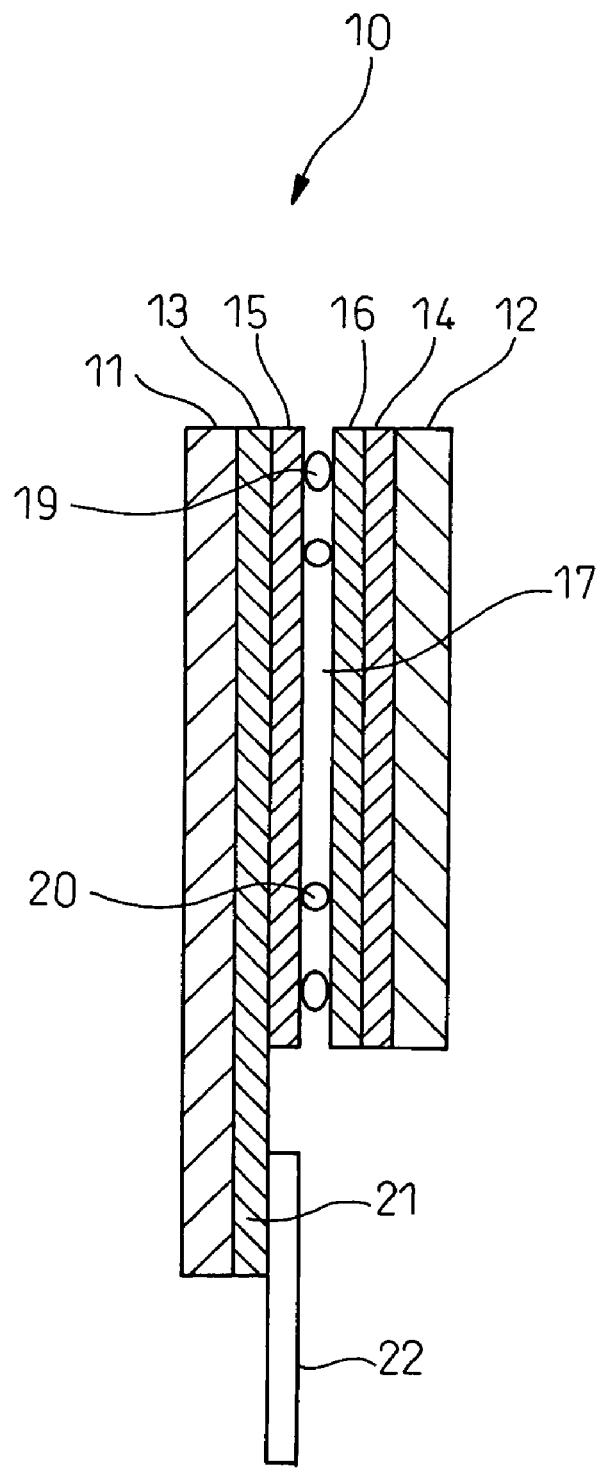
FIG. 3 is a cross-sectional view showing the structure of the liquid crystal lens.

Next, the structure of the liquid crystal lens will be described below. FIGS. 2 and 3 respectively are a front view and a cross-sectional view showing the cell structure of the liquid crystal lens.

The liquid crystal lens 1 comprises a liquid crystal panel 10, etc. In the liquid crystal panel 10, a patterned electrode 13 and a common electrode 14 are disposed facing each other on the inside surfaces of a pair of opposing glass substrates 11 and 12. Alignment films 15 and 16 are disposed facing each other on the inside surfaces of the patterned electrode 13 and the common electrode 14. A homogeneously aligned liquid crystal layer 17 is sealed between the alignment films 15 and 16, but another kind of liquid crystal layer may be used instead.

The liquid crystal lens for P waves and the liquid crystal lens for S waves are identical in structure, but their liquid crystal layers 17 are oriented at 90° to each other. When the refractive index profile of the liquid crystal lens for P waves is changed, light whose plane of polarization coincides with the orientation direction of the liquid crystal lens for P waves is affected by the change in the refractive index profile, but light whose plane of polarization is at right angles to the orientation direction of the liquid crystal lens for P waves is unaffected by the change in the refractive index profile. The same can be said of the liquid crystal lens for S waves.

For this reason, two liquid crystal lenses oriented at 90° to each other, i.e., the liquid crystal lens for P waves and the liquid crystal lens for S waves, must be provided. The liquid crystal lens for P waves and the liquid crystal lens for S waves are both driven by a drive voltage of the same waveform. The drive voltage is, for example, a pulse-height modulated (PHM) or pulse-width modulated (PWM) AC voltage.

A lens area 18 whose refractive index changes with the applied voltage is provided in the center of the liquid crystal lens 1. The liquid crystal lens 1 is sealed around its periphery by a sealing member 19. The thickness of the liquid crystal layer 17 is held constant by means of spacer members 20. A flexible printed circuit board (FPC) 22 is connected to electrode leads 21 of the patterned electrode 10 by using an anisotropic conductive film. Some of the electrode leads 21 are electrically isolated from the patterned electrode 13 and are connected to the common electrode 14.

The dimensions of the liquid crystal lens 1 are given below by way of example, though they are not specifically limited to the values given here. The glass substrates 11 and 12 each measure 10 millimeters square, but the size can range from several millimeters to a dozen or so millimeters. For the glass substrate 11 on which the patterned electrode 13 is formed, however, this dimension excludes the portion that covers the electrode leads 21 of the patterned electrode 13. The thickness of each of the glass substrates 11 and 12 is 300 µm, but thickness in the range of several hundred microns is allowable. The thickness of the liquid crystal layer 14 is 23 µm but can range from a dozen or so microns to several tens of microns. The diameter of the lens area 18 is 2.4 mm, but a diameter in the range of a few millimeters is allowable.

Figure 4:
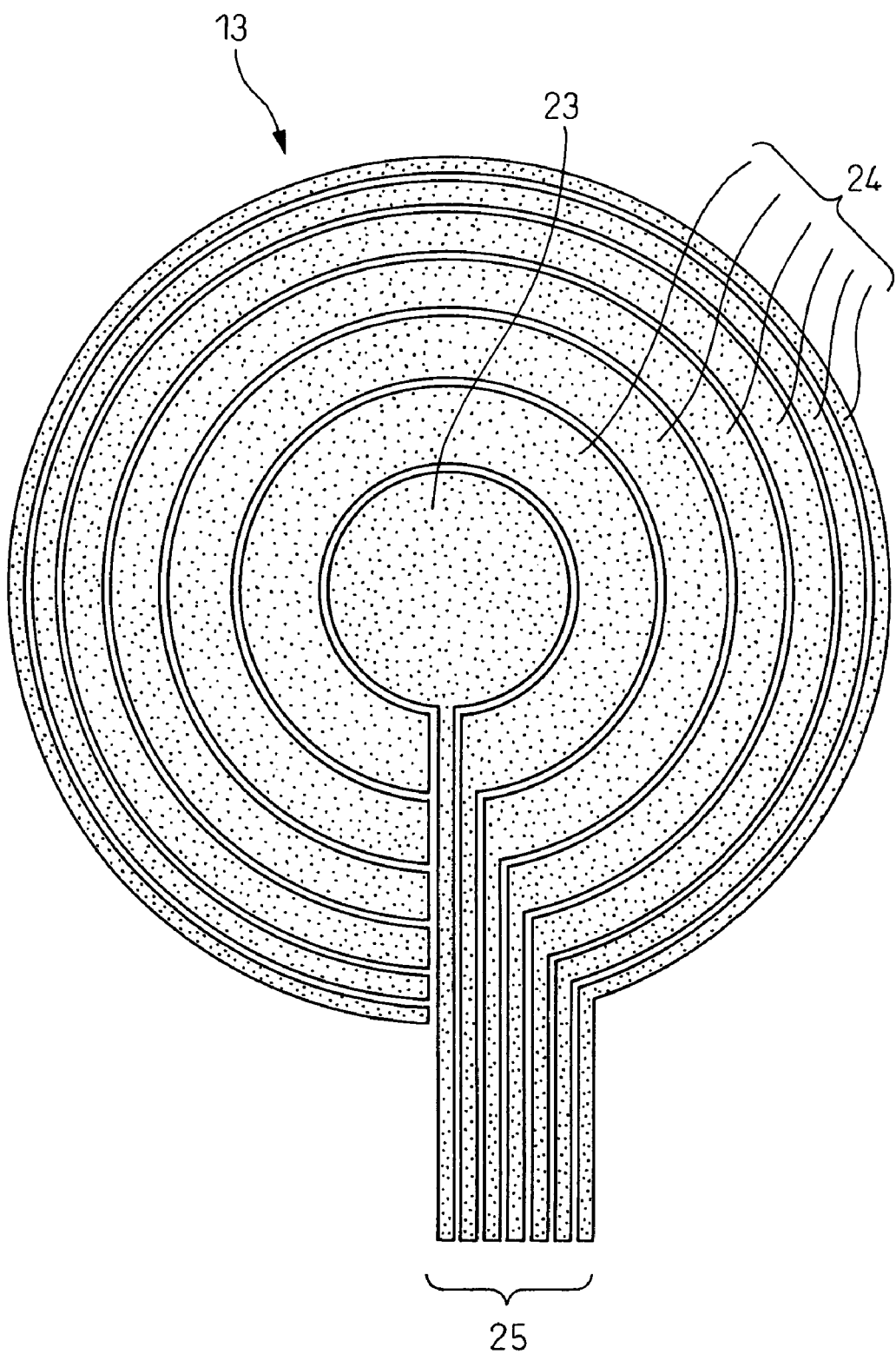
FIG. 4 is a front view showing the structure of a patterned electrode.

FIG. 4 is a front view schematically showing the structure of the patterned electrode 13.

As shown in FIG. 4, the patterned electrode 13 has a pattern comprising a plurality of C-shaped ring electrodes 24 which are formed in concentric circles of different radii around a circular shaped center electrode 23. An insulating space is provided between the center electrode 23 and the innermost ring electrode 24, as well as between each pair of adjacent ring electrodes 24. For reasons of illustration, the number of ring electrodes 24 shown in FIG. 4 is different from the actual number.

A plurality of leader electrodes 25 extend radially outward from the center electrode 23 and the plurality of ring electrodes 24 in such a manner as to be electrically isolated from each other. The patterned electrode 13 shown in FIG. 4 is formed so as to be superimposed on the lens area 18 (see FIG. 2).

When different voltages are applied to the respective leader electrodes 25, the center electrode 23 and the ring electrodes 24 are brought to respectively different potentials with respect to the common electrode 14, generating a voltage profile across the lens area 18. When this voltage profile is changed, the refractive index profile of the liquid crystal lens 1 changes, and the liquid crystal lens 7 can thus be made to function as a convex lens, parallel glass plates, or a concave lens.

The dimensions of the various portions of the patterned electrode 13 are given below by way of example, though they are not specifically limited to the values given here. The total number of electrodes, i.e., the center electrode 23 and the ring electrodes 24, is 20. Here, consider the distance from the center to the outer periphery of the center electrode 23 and the distance from the center to the outer periphery of each ring electrode 24 by assuming that the center electrode 23 is represented by n=1 and the ring electrodes 24 by n=2 to n=20 in this order from the innermost one to the outermost one. The patterned electrode 13 is formed so that the relation $n=Ar_n^2$ (A: constant) holds, where $r_n$ is the distance from the center to each electrode. The dimensions used in the present embodiment are shown in Table 1 below. The width of the space provided between adjacent ones of the center electrode 23 and ring electrode 24 is 3 µm. The dimensions shown in Table 1 and the width of the space provided between adjacent ones of the center electrode 23 and ring electrode 24 are only examples and are not limited to the values given here.

TABLE 1

|  | n | Distance (µm) |
|---|---|---|
| Center Electrode | 1 | 268 |
| Ring Electrodes | 2 | 379 |
|  | 3 | 464 |
|  | 4 | 536 |
|  | 5 | 600 |
|  | 6 | 657 |
|  | 7 | 709 |
|  | 8 | 758 |
|  | 9 | 804 |
|  | 10 | 848 |
|  | 11 | 889 |
|  | 12 | 929 |
|  | 13 | 967 |
|  | 14 | 1003 |
|  | 15 | 1039 |
|  | 16 | 1073 |
|  | 17 | 1106 |
|  | 18 | 1138 |
|  | 19 | 1169 |
|  | 20 | 1200 |

Next, the liquid crystal lens control unit or the focus signal extracting unit, focusing point identifying unit, focusing point adjusting unit, and switching voltage application unit will be described below.

First, a description will be given of the autofocus operation that the autofocus controller 5 performs in the focus signal extracting unit and focusing point identifying unit provided in the automatic focusing apparatus according to the present invention.

Figure 5A:
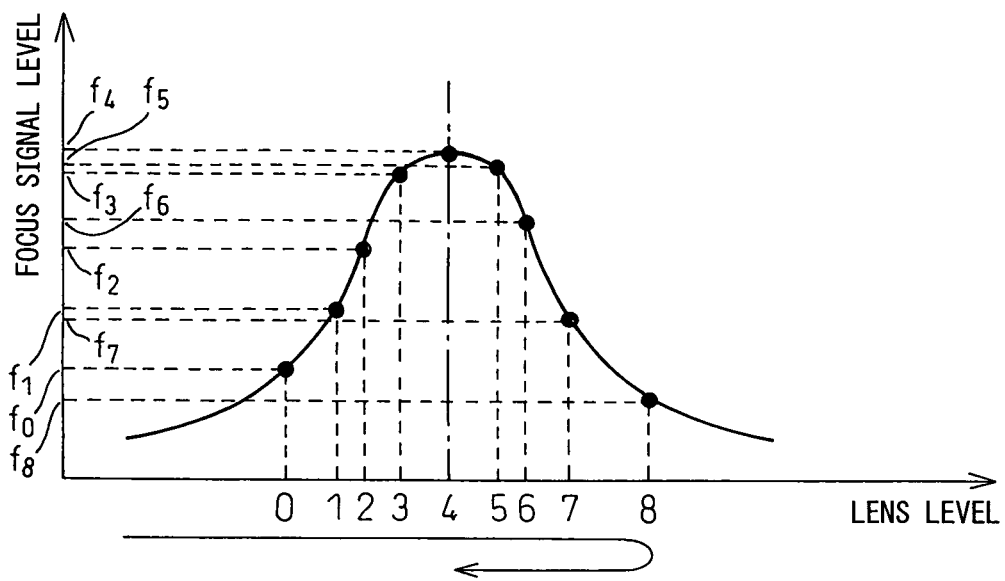
FIG. 5($a$) is a diagram schematically showing an automatic focusing operation based on a scan method, and FIG. 5($b$) is a diagram schematically showing an automatic focusing operation based on a hill climbing method.
Figure 5B:
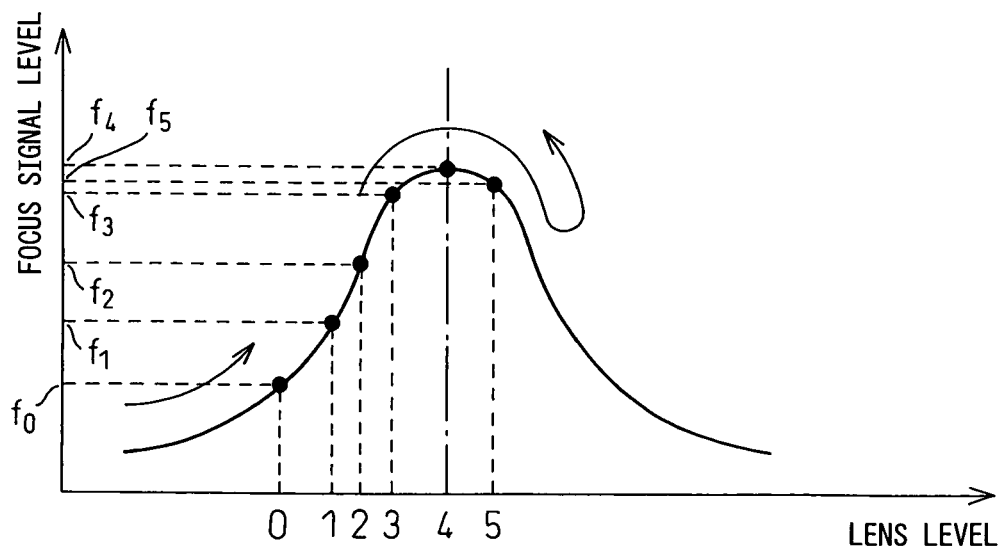

FIG. 5(a) is a diagram schematically showing an autofocus control operation (based on a scan method), and FIG. 5(b) is a diagram schematically showing an autofocus control operation (based on a hill climbing method). In FIGS. 5(a) and 5(b), the ordinate represents the focus signal level, and the abscissa represents the lens level. Here, the lens level refers to the set value of the lens condition (the lens condition corresponding to the focal length) which is obtained by controlling the liquid crystal lens 1 by the focus signal extracting unit and focusing point identifying unit so as to achieve a desired one of predetermined focal lengths, as will be described later.

In the case of the scan method, first the focus signal extracting unit obtains the focus signal levels ($f_0$ to $f_8$) for all the lens levels (0 to 8), as shown in FIG. 5(a), and then, the focusing point identifying unit identifies the lens level closest to the in-focus condition (in this case, the lens level at which the focus signal level becomes maximum). In this scan method, the process for obtaining the focus signal levels for all the lens levels corresponds to the focus signal extraction process, and the process for identifying the lens level corresponding to the largest focus signal level of all the focus signal levels thus obtained corresponds to the focusing point identifying process. The scan method is further classified into two methods: a method in which the focus signal levels are successively sampled after waiting until the behavior of the liquid crystal molecules stabilizes after prescribed voltages are applied to the center electrode 23 and the plurality of ring electrodes 24 in the liquid crystal lens 1, and a method in which, while applying prescribed voltages to the center electrode 23 and the plurality of ring electrodes 24 in the liquid crystal lens 1, a plurality of focus signals are sampled during the transient response period when the liquid crystal molecules are in the process of responding to the applied voltages.

In the case of the hill climbing method, as shown in FIG. 5(b), the previously detected focus signal level ($f_0$) corresponding to a first lens level (for example, lens level 0) is compared with the currently detected focus signal level ($f_1$) corresponding to a second lens level (for example, lens level 1) which is different from the first lens level, to check whether the focus signal level has increased or decreased, and subsequently the focus signal level ($f_2$) corresponding to the third lens level (for example, lens level 2) is extracted, thereby successively comparing one focus signal with the next. In this process, if the focusing point identifying unit detects the focus signal level ($f_4$) corresponding to the lens level (for example, lens level 4) at which the focus signal level reaches a maximum, the focus signal extraction process is terminated. In this hill climbing method, the process for successively comparing the focus signal obtained for a certain lens level with the previously obtained focus signal to check whether the signal level has increased or decreased, and then proceeding to the next lens level, corresponds to the focus signal extraction process, and the process for identifying whether the focus signal level corresponding to the current lens level is larger than those corresponding to the lens levels before and after the current lens level corresponds to the focusing point identifying process.

The present embodiment will be described below by using a scan method. First, the lens level of the liquid crystal lens 1 will be described. In the present embodiment, the desired focus length can be obtained by defining the lens level corresponding to the focal length of the liquid crystal lens 1 and by setting the lens level. Table 2 shows the relationship between the lens level and the focal length. The number of lens levels and the numeric values shown in Table 1 are only examples, and are not limited to the examples shown here.

TABLE 2

| Lens Level | Focal Length: f[mm] |
|---|---|
| 0 | 273 |
| 1 | 365 |
| 2 | 547 |
| 3 | 1095 |
| 4 | ∞ |
| 5 | −1095 |
| 6 | −547 |
| 7 | −365 |
| 8 | −273 |

For convenience of explanation, in the present embodiment, the focal length f when the liquid crystal lens 1 is set to function as a convex lens is expressed by a positive numeric value, and the focal length f when the liquid crystal lens 1 is set to function as a concave lens is expressed by a negative numeric value. In this case, when the focal length f of the liquid crystal lens 1 is at positive or negative infinity, the liquid crystal lens 1 functions as parallel glass plates.

As shown in Table 2, in the present embodiment, the lens level that achieves a focal length of 273 mm is defined as "0", and the lens levels that achieve other focal lengths are defined in the same manner, i.e., a focal length of 365 mm as "1", a focal length of 547 mm as "2", a focal length of 1095 mm as "3", a focal length ∞ as "4", a focal length of −1095 mm as "5", a focal length of −547 mm as "6", a focal length of −365 mm as "7", and a focal length of −273 mm as "8".

Next, a description will be given of the focusing point adjusting unit provided in the automatic focusing apparatus according to the present invention, while making a comparison with the voltages that the focus signal extracting unit applies to the center electrode 23 and the ring electrodes 24.

FIG. 6 is a diagram showing the relationship between the voltage applied to the liquid crystal and the retardation value according to the present embodiment. In FIG. 6, the ordinate represents the retardation (nm) of the liquid crystal lens 1, and the abscissa represents the root-mean-square voltage (Vrms).

When respectively different voltages are applied to the center electrode 23 and the respective ring electrodes 24, a refractive index profile changing from one electrode to the next is obtained. Here, taking into consideration the case where the voltages falling within the "V1 range" in FIG. 6 and the voltages falling within the "V2 range" are respectively applied. When the voltages falling within the "V1 range" in FIG. 6 are applied, the retardation values obtained at the center electrode 23 and the respective ring electrodes 24 fall within the "Re1 range" in FIG. 6. On the other hand, when the voltages falling within the "V2 range" in FIG. 6 are applied, the retardation values obtained at the center electrode 23 and the respective ring electrodes 24 fall within the "Re2 range" in FIG. 6. The magnitudes of the retardation values at the center electrode 23 and the respective ring electrodes 24 differ between these two cases. However, the magnitude of the difference in retardation value between the center electrode 23 and each ring electrode 24 can be made the same between the two cases. By making the magnitude of the difference in retardation value the same in this manner, the same refractive index profile can be generated across the lens area 18 in either case. If the refractive index profile is the same for the "Re1 range" as for the "Re2 range", then the focal length of the liquid crystal lens 1 becomes the same. On the other hand, it is known that better focusing performance can be achieved with the lens condition obtained in the "Re2 range" than the lens condition obtained in the "Re1 range".

In the automatic focusing apparatus according to the present invention, the processing in the focus signal extracting unit is performed by applying the voltages falling within the "V1 range" in FIG. 6. On the other hand, in the processing performed in the focusing point adjusting unit, the lens is set to the lens level obtained by the focusing point identifying unit, by applying the voltages in the "V2 range" which are lower than the voltages in the "V1 range".

As an example, voltages applied to achieve the condition corresponding to lens level 2 (refer, for example, to FIG. 5(a)) in the present embodiment will be described below. Table 3 shows the voltages that the focus signal extracting unit applies to the respective electrodes to achieve lens level 2, along with the voltages applied to the respective electrodes for focusing point adjustment. The applied voltage values shown in Table 3 are only examples, and are not limited to the values given here.

TABLE 3

| | n | V1: Focus Signal Extraction [V] | V2: Focusing point Adjustment [V] |
|---|---|---|---|
| Center Electrode | 1 | 3.06 | 2.09 |
| Ring Electrodes | 2 | 3.14 | 2.12 |
| | 3 | 3.22 | 2.15 |
| | 4 | 3.30 | 2.18 |
| | 5 | 3.40 | 2.21 |
| | 6 | 3.50 | 2.24 |
| | 7 | 3.62 | 2.27 |
| | 8 | 3.75 | 2.30 |
| | 9 | 3.90 | 2.33 |
| | 10 | 4.06 | 2.37 |
| | 11 | 4.26 | 2.41 |
| | 12 | 4.49 | 2.44 |
| | 13 | 4.75 | 2.48 |
| | 14 | 5.06 | 2.52 |
| | 15 | 5.40 | 2.56 |
| | 16 | 5.79 | 2.61 |
| | 17 | 6.23 | 2.65 |
| | 18 | 6.74 | 2.70 |
| | 19 | 7.41 | 2.75 |
| | 20 | 8.40 | 2.80 |

As can be seen from Table 3, the voltages applied by the focusing point adjusting unit (voltages in the "V2 range") are lower than the voltages applied by the focus signal extracting unit (voltages in the "V1 range"). While the above has shown the case of lens level 2 as an example, it is to be understood that, for all the lens levels, the voltages applied by the focusing point extracting means (voltages in the "V2 range") are lower than the voltages applied by the focus signal extracting unit (voltages in the "V1 range").

Next, a description will be given of the time required to accomplish the focus signal extraction in the present embodiment. The response time, i.e., the time taken to respond to a change in the lens level of the liquid crystal lens 1, will be described. Table 4 shows by way of example the time taken for the liquid crystal lens 1 to stabilize when the lens level is changed at 25° C., for the voltages in the "V1 range" and the voltages in the "V2 range", respectively.

TABLE 4

| Lens Level | V1: Focus Signal Extraction [ms] | V2: Focusing point Adjustment [ms] |
|---|---|---|
| 0 → 1 | 200 | 600 |
| 1 → 2 | 100 | 500 |
| 2 → 3 | 80 | 300 |
| 3 → 4 | 60 | 150 |

TABLE 4-continued

| Lens Level | V1: Focus Signal Extraction [ms] | V2: Focusing point Adjustment [ms] |
|---|---|---|
| 4 → 5 | 120 | 250 |
| 5 → 6 | 150 | 350 |
| 6 → 7 | 200 | 500 |
| 7 → 8 | 300 | 700 |
| Total | 1210 | 3350 |

In the present embodiment, since the focus signal extraction is performed using the scan method shown in FIG. 5(a), the focus signal extraction starts at lens level 0, and proceeds in the order of lens levels 1, 2, 3, 4, 5, 6, 7, and 8. That is, the time shown in the "Total" entry is required to accomplish the focus signal extraction. As can be seen from Table 4, the focus signal extraction with the voltages in the "V2 range" takes more than three seconds, which is not practical. On the other hand, with the voltages in the "V1 range", the focus signal extraction completes in a little more than one second, which is practical.

Next, a description will be given of the focusing performance by making a comparison between the lens condition obtained by the refractive index profile in the "Re1 range" shown in FIG. 6 and the lens condition obtained by the refractive index profile in the "Re2 range".

Figure 7A:
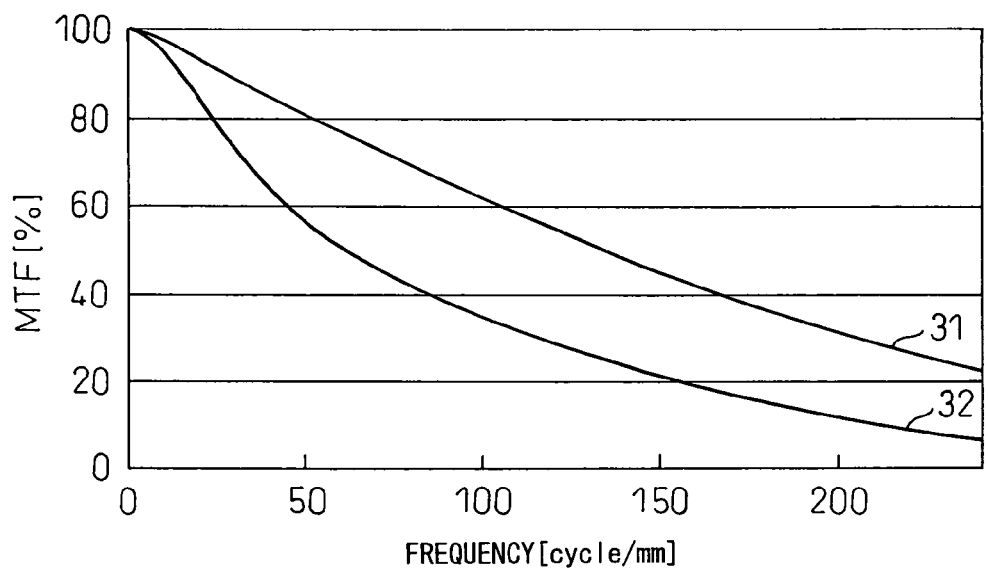
FIG. 7($a$) is a diagram showing MTF values in Re1 range, and FIG. 7($b$) is a diagram showing MTF values in Re2 range.
Figure 7B:
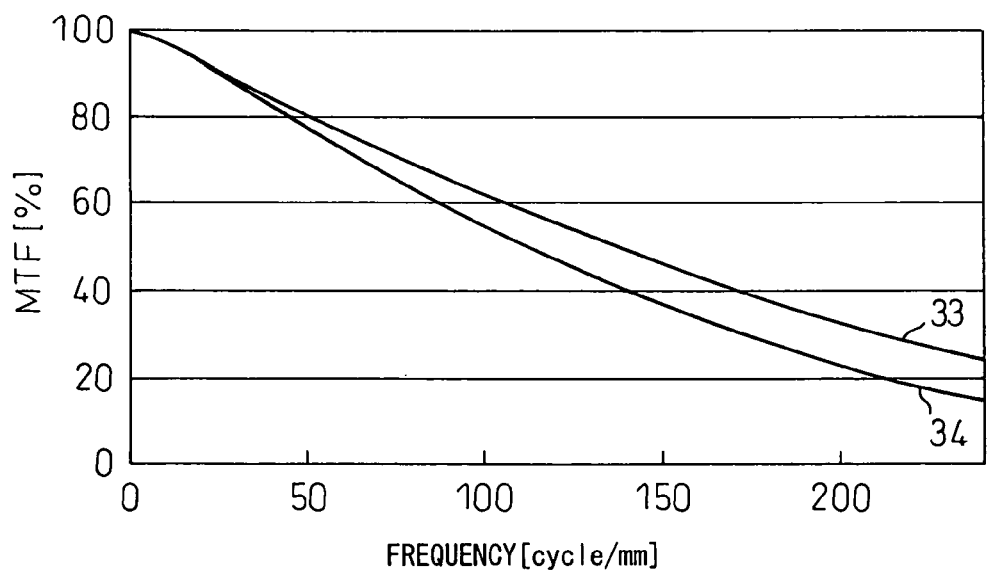

FIG. 7 is a diagram showing the MTF in the lens condition obtained by the refractive index profile that achieves the lens level 2. Here, FIG. 7(a) shows the MTF in the condition corresponding to the lens level 2 obtained by the refractive index profile in the "Re1 range", and FIG. 7(b) shows the MTF in the condition corresponding to the lens level 2 obtained by the refractive index profile in the "Re2 range". In FIGS. 7(a) and 7(b), the abscissa represents the spatial frequency (cycle/mm: line pairs per millimeter), and the ordinate represents the optical contrast (MTF: Modulation Transfer Function) on the image plane. Here, 31 shown in FIGS. 7(a) and 33 shown in FIG. 7(b) each indicate the MTF at the image height of 0%, and 32 in FIGS. 7(a) and 34 in FIG. 7(b) each indicate the MTF at the image height of 40%. The image height here is expressed as a percentage when the height from the center of the field angle at which to measure the MTF to the edge of the field angle is taken as 100%.

As shown in FIG. 7, at the image height of 0%, the MTF 31 for the case of the "Re1 range" corresponding to the applied voltages in the "V1 range" and the MTF 33 for the case of the "Re2 range" corresponding to the applied voltages in the "V2 range" are approximately the same. However, it can be seen that, at the image height of 40%, the MTF 34 for the case of the "Re2 range" is higher than the MTF 32 for the case of the "Re1 range". This means that better focusing performance can be achieved with the lens condition obtained by the refractive index profile in the "Re2 range" corresponding to the applied voltages in the "V2 range".

For the above reason, in the present embodiment, the voltages in the "V1 range" are applied to the liquid crystal lens 1 when performing the focus signal extraction, and the voltages in the "V2 range" are applied to the liquid crystal lens 1 when performing the focusing point adjustment.

Figure 8:
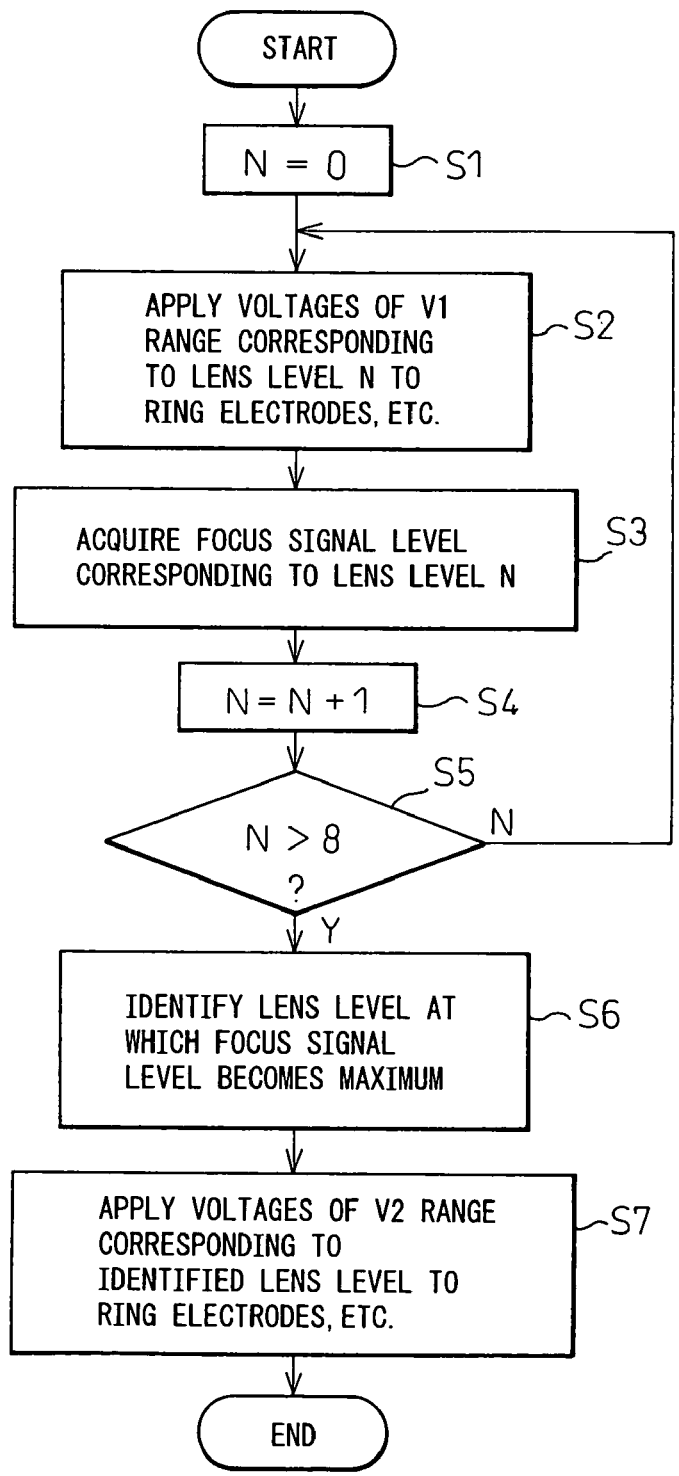
FIG. 8 is a diagram showing one example of an automatic focusing process flow.

FIG. 8 is a diagram showing one example of the automatic focusing process flow.

In the flow shown in FIG. 8, the microprocessor 51 performs the processing by cooperating with the various elements of the automatic focusing apparatus of the present invention in accordance with the programs prestored in the storage unit 52. The following flow is based on the earlier described scan method.

First, the microprocessor 51 sets N to 0 (S1).

Next, the microprocessor 51 performs control so that the voltages (in the "V1 range") corresponding to lens level 0 are applied from the LC lens driver 6 to the center electrode 23 and the respective ring electrodes (R1 to R20) (S2), and acquires the resulting focus signal level from the imaging device 3 (S3). Next, the microprocessor 51 sets N to N+1 (S4), and checks whether N is larger than 8 (S5). By repeating the steps S1 to S5, the microprocessor 51 extracts the focus signal levels for all the lens levels 0 to 8 (focus signal extraction). Examples of the voltages (in the "V1 range") applied to the center electrode 23 and the respective ring electrodes 24 (R1 to R20), for example, to achieve the lens level 2, are shown in Table 3. The number of lens levels given here is only an example, and is not limited to 9.

Next, the microprocessor 51 identifies the lens level at which the extracted focus signal level becomes maximum (focusing point identification) (S6). In the example of FIG. 5(a), the extracted focus signal level becomes maximum at lens level 4.

Next, the microprocessor 51 performs control so that the voltages (in the "V2 range") corresponding to the thus identified lens level are applied from the LC lens driver 6 to the center electrode 23 and the respective ring electrodes (R1 to R20) (S7), and terminates the automatic focusing process. Examples of the voltages (in the "V2 range") applied to the center electrode 23 and the respective ring electrodes 24 (R1 to R20), for example, to achieve the lens level 2, are shown in Table 3.

Figure 9:
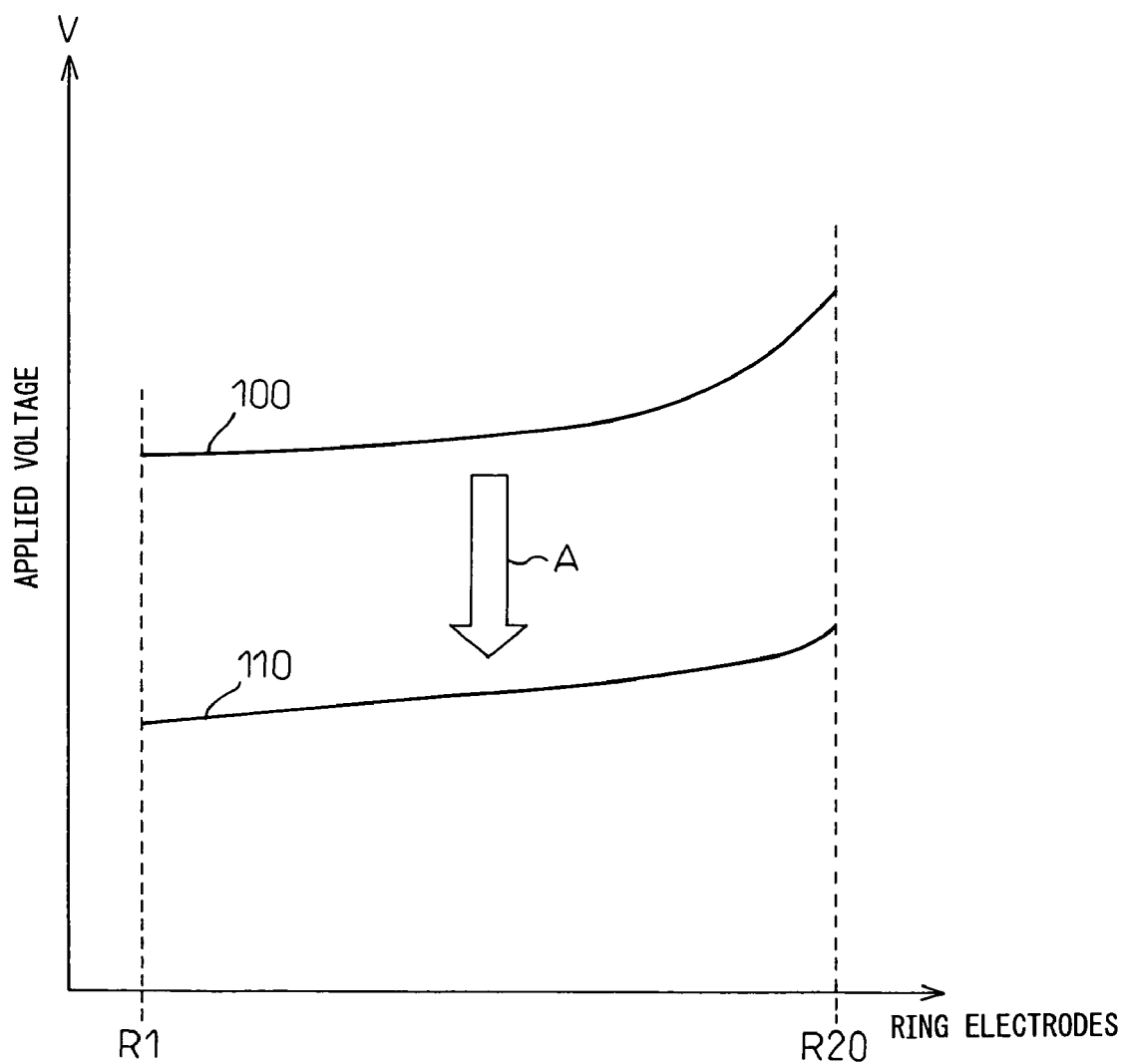
FIG. 9 is a diagram showing how the voltages applied to respective ring electrodes are changed in the flow shown in FIG. 8.

FIG. 9 is a diagram showing how the voltages applied to the respective ring electrodes are changed in the flow shown in FIG. 8. In FIG. 9, the ordinate represents the applied voltage, and the abscissa represents the ring electrode position. R1 indicates the innermost ring electrode, and R20 the outermost ring electrode. Curves 100 and 110 shown in FIG. 9 are each drawn by plotting the voltages applied to the respective ring electrodes (1 to 20) and joining the plotted points.

In FIG. 9, curve 100 represents the voltages in the "V1 range" applied to the respective ring electrodes when the last lens level was measured by the scan method (refer to lens level 8 in FIG. 5(a)).

Further, in FIG. 9, curve 110 represents the voltages in the "V2 range" corresponding to the lens level that is identified in S6 of FIG. 8 as being the lens level at which the focus signal level becomes maximum. For example, if lens level 2 is identified in S6 in FIG. 8 as being the lens level at which the focus signal level becomes maximum, the curve represents the voltages in the "V2 range" shown in Table 3.

In other words, in S7 of FIG. 8, the LC lens driver 6 under the control of the microprocessor 51 changes the voltages applied to the respective ring electrodes from those represented by curve 100 to those represented by curve 110 (see arrow A).

Here, it is assumed that the voltages in the "V1 range" and the voltages in the "V2 range" applied to the respective ring electrodes in order to obtain all the lens levels are prestored in the storage unit 52. For example, when there are 9 lens levels (lens levels 0 to 8), a total of 9×2=18 combinations of applied voltages are stored for the ring electrodes (for example, 1 to 20).

As described above, when performing the focus signal extraction, voltages (in the "V1 range") that serve to increase the operating speed of the liquid crystal are applied, and after the lens level at which the focus signal becomes maximum is identified in the focusing point identifying process, voltages (in the "V2 range") that do not degrade the focusing performance are applied. Accordingly, in the present embodiment, the automatic focusing can be accomplished at high speed and without degrading the focusing performance at the time of focusing.

Figure 10:
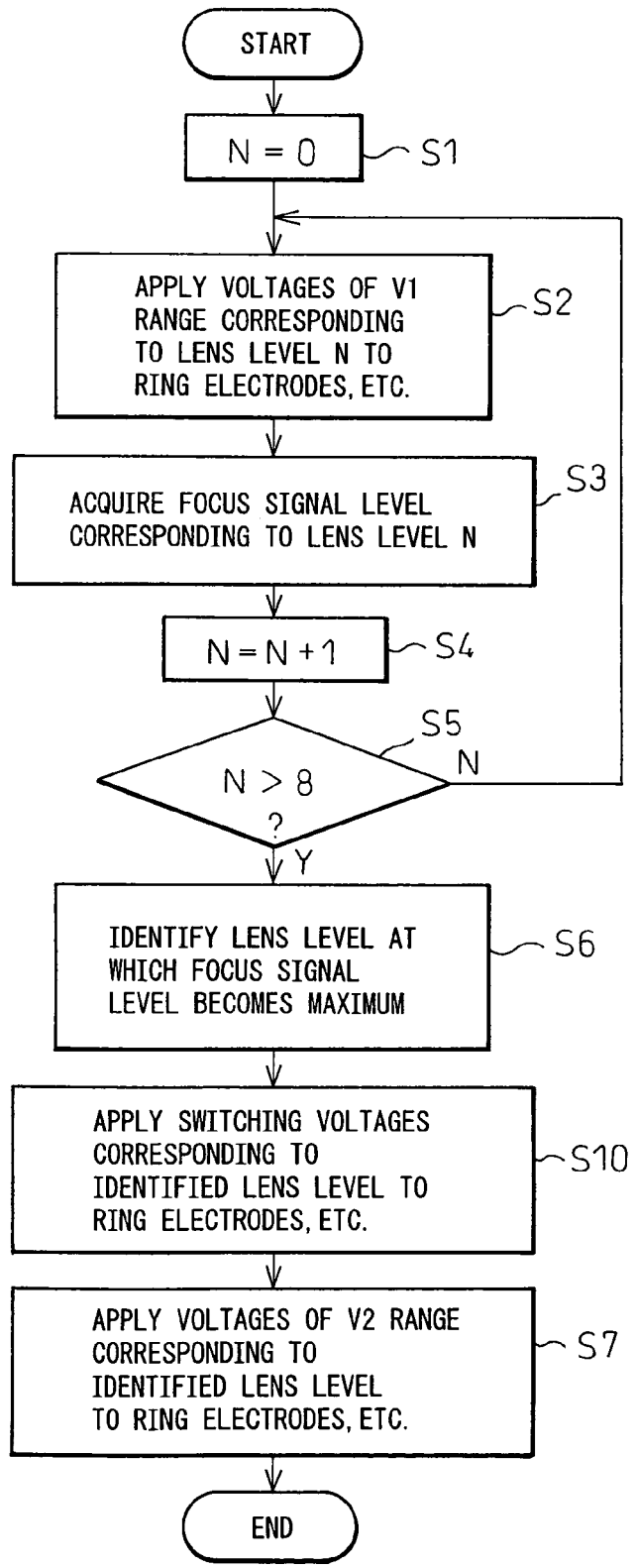
FIG. 10 is a diagram showing another example of the automatic focusing process flow.

FIG. 10 is a diagram showing another example of the automatic focusing process flow.

In the flow shown in FIG. 10, the microprocessor 51 performs the processing by cooperating with the various elements of the automatic focusing apparatus of the present invention in accordance with the programs prestored in the storage unit 52. The following flow is based on the earlier described scan method.

In the process flow shown in FIG. 8, after the last lens level was measured by the scan method, the applied voltages were changed from the voltages (curve 100 in FIG. 9) in the "V1 range" applied to achieve that lens level to the voltages (curve 110 in FIG. 9) in the "V2 range" corresponding to the lens level identified in S6 in FIG. 8 as being the lens level at which the focus signal level becomes maximum. However, if the voltages (curve 110 in FIG. 9) in the "V2 range" corresponding to the lens level identified in S6 in FIG. 8 as being the lens level at which the focus signal level becomes maximum are applied, the liquid crystal molecules cannot instantly change to the stable state in response to the applied voltages. A time lag thus occurs. In view of this, in the process flow of FIG. 10, to reduce the time lag, switching voltages are applied before applying the voltages in the "V2 range" corresponding to the lens level identified as being the lens level at which the focus signal level becomes maximum.

In FIG. 10, the same steps as those in FIG. 8 are designated by the same step numbers, and the description of such steps will not be repeated here. In other words, the process flow of FIG. 10 differs in that an additional step S10 is provided between S6 and S7 in FIG. 8.

Figure 11:
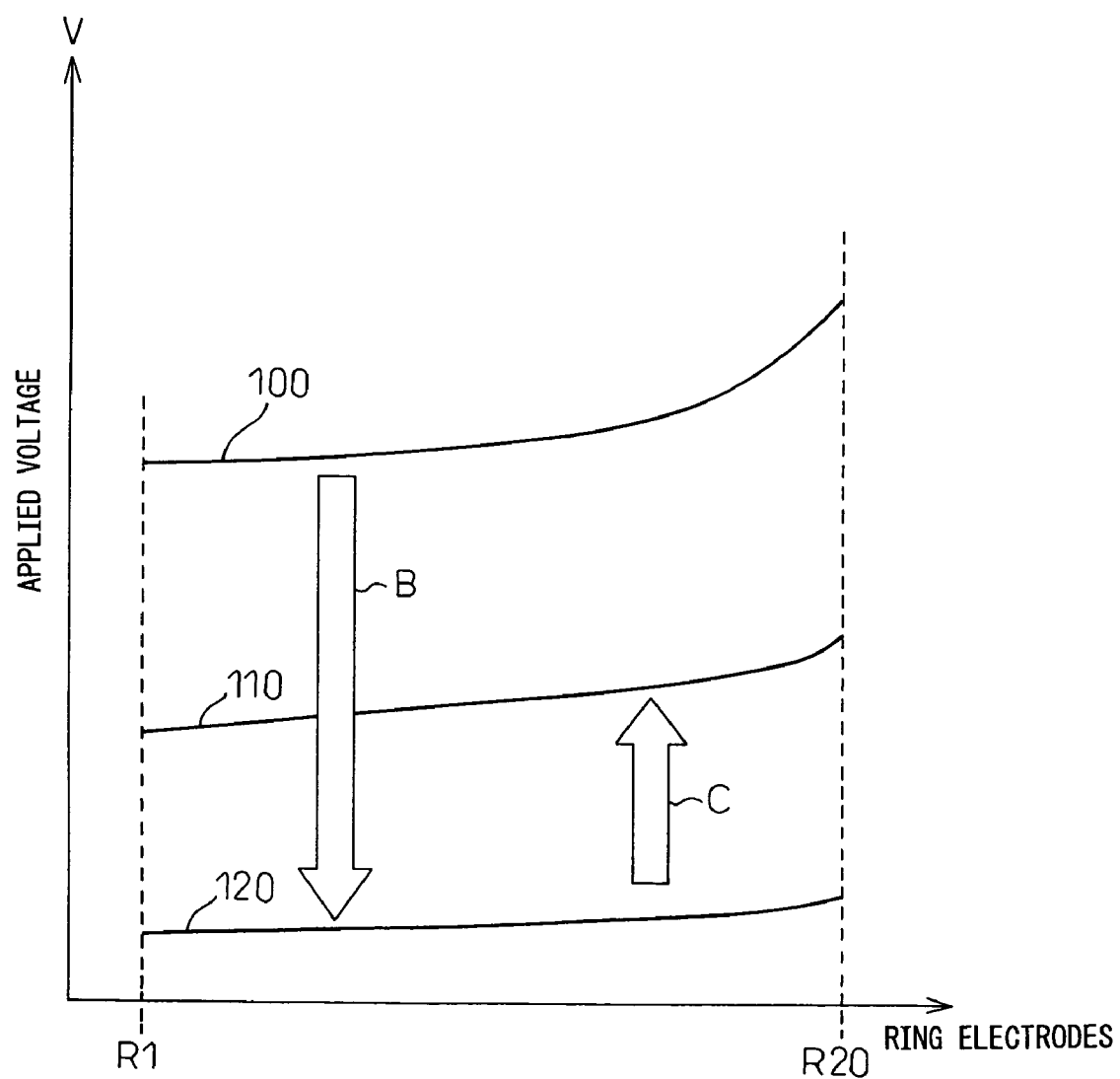
FIG. 11 is a diagram showing how the voltages applied to the respective ring electrodes are changed in the flow shown in FIG. 10.

FIG. 11 is a diagram showing how the voltages applied to the respective ring electrodes are changed in the flow shown in FIG. 10. In FIG. 11, the ordinate represents the applied voltage, and the abscissa represents the ring electrode position. R1 indicates the innermost ring electrode, and R20 the outermost ring electrode. Curves 100, 110, and 120 shown in FIG. 11 are each drawn by plotting the voltages applied to the respective ring electrodes (1 to 20) and joining the plotted points.

In FIG. 11, curves 100 and 110 are the same as those shown in FIG. 9. In FIG. 11, curve 120 represents the switching voltages applied in S10 of FIG. 10.

The switching voltages represented by curve 120 utilize the principle of transient response; that is, voltages whose potential difference is greater than that of the target voltages (curve 110) are applied in advance, making it easier for the liquid crystal molecules to change to the stable state in response to the target voltages (curve 110).

In S10 of FIG. 10, under the control of the microprocessor 51, the LC driver 6 first changes the voltages applied to the respective ring electrodes from those represented by curve 100 to those represented by curve 120 (see arrow B). In other words, the autofocus controller 5 and the liquid crystal lens driver 6 function as the switching voltage application unit.

Next, in S7 of FIG. 10, under the control of the microprocessor 51, the LC lens driver 6 changes the voltages applied to the respective ring electrodes from those represented by curve 120 to those represented by curve 110 (see arrow C).

In this way, in the process flow shown in FIG. 10, since provisions are made to apply the target voltages (curve 110) after applying the switching voltages (curve 120) whose potential difference relative to the starting voltages (curve 100) is greater than that of the target voltages (110), it is possible to reduce the time lag with which the liquid crystal molecules change to the stable state in response to the applied voltages.

Here, the switching voltages (curve 120) are chosen to have values such that, when switching is made from the switching voltages (curve 120) to the target voltages (curve 110), the time lag is almost equally reduced for all the ring electrodes (for example, 1 to 20); therefore, it is preferable that as many sets of switching voltages be provided in advance as the total number of combinations of starting voltages (curve 100) and target voltages (curve 110).

For example, when there are 9 lens levels (lens levels 0 to 8), since there is one possible combination of starting voltages (curve 100) and 9 possible combinations of target voltages (curve 110) in the case of the scan method, a total of 1×9=9 sets of switching voltages (curve 120) should be created and stored in advance in the storage unit 51. On the other hand, in the case of the hill climbing method, there are 9 possible combinations of starting voltages (curve 100) and 9 possible combinations of target voltages (curve 110), a total of 9×9=81 sets of switching voltages (curve 120) should be created and stored in advance in the storage unit 51.

Here, GND voltage may be used as the switching voltages. However, if GND voltage is used, then when switching is made to the target voltages, the time required for the liquid crystal molecules to stabilize in response to the target voltages becomes different for each ring electrode. In view of this, if the timing for switching from the switching voltages to the target voltages is staggered from one ring electrode to the next, the time required for the liquid crystal molecules to stabilize in response to the target voltage can be shortened.

Figure 12:
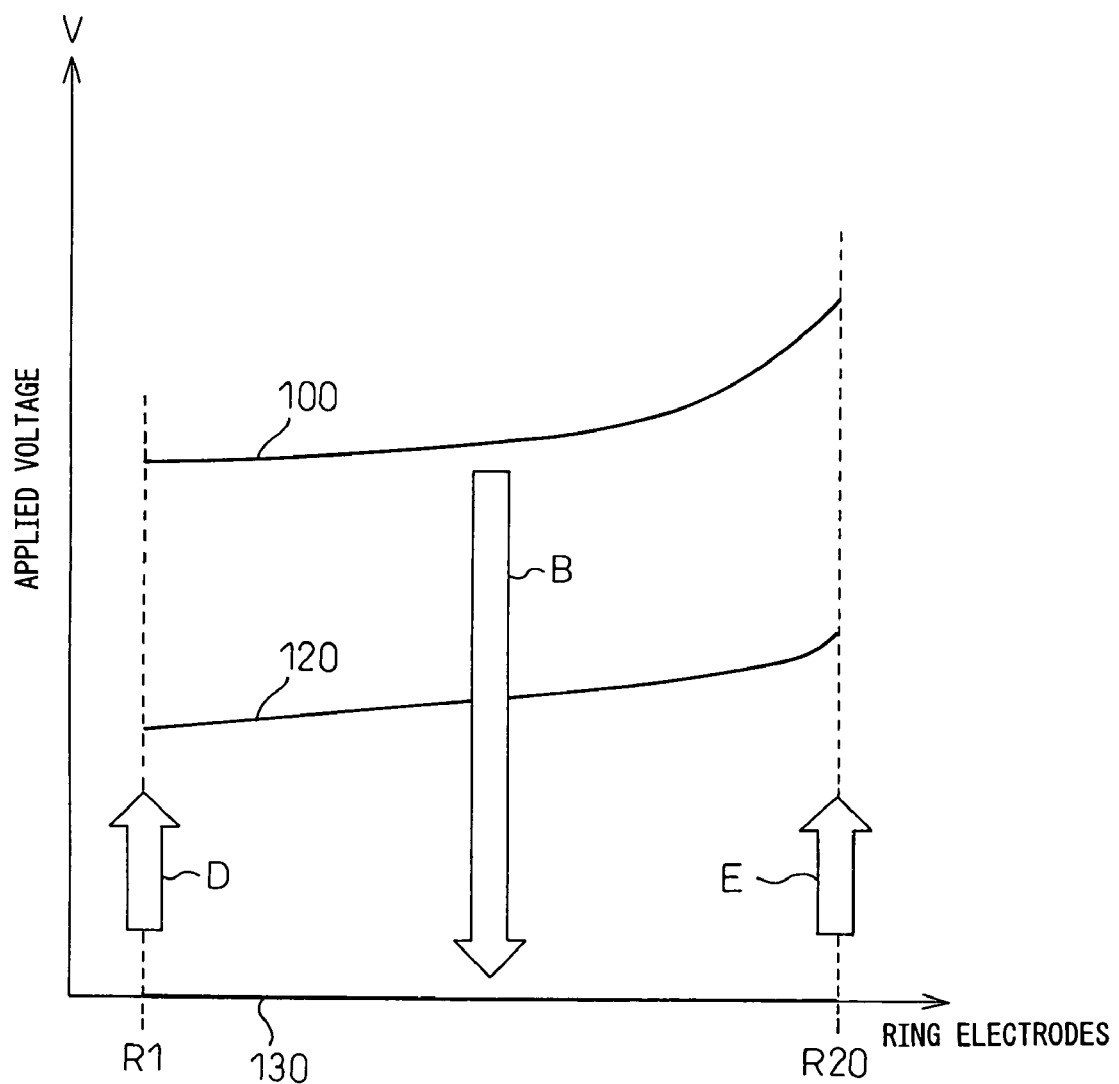
FIG. 12 is a diagram showing another example of how the voltages applied to the respective ring electrodes are changed.

FIG. 12 is a diagram showing how the voltages applied to the respective ring electrodes change when the above arrangement is made. In FIG. 12, the ordinate represents the applied voltage, and the abscissa represents the ring electrode position. R1 indicates the innermost ring electrode, and R20 the outermost ring electrode. Curves 100 and 110 and straight line 130 (representing the GND voltage used as the switching voltages) shown in FIG. 12 are each drawn by plotting the voltages applied to the respective ring electrodes (1 to 20) and joining the plotted points.

In other words, as shown in FIG. 12, control is performed so that the timing (indicated by arrow D) for switching from the GND voltage to the target voltage for R1 (the innermost ring electrode) is different from the timing (indicated by arrow E) for switching from the GND voltage to the target voltage for R20 (the outermost ring electrode).

Figure 13:
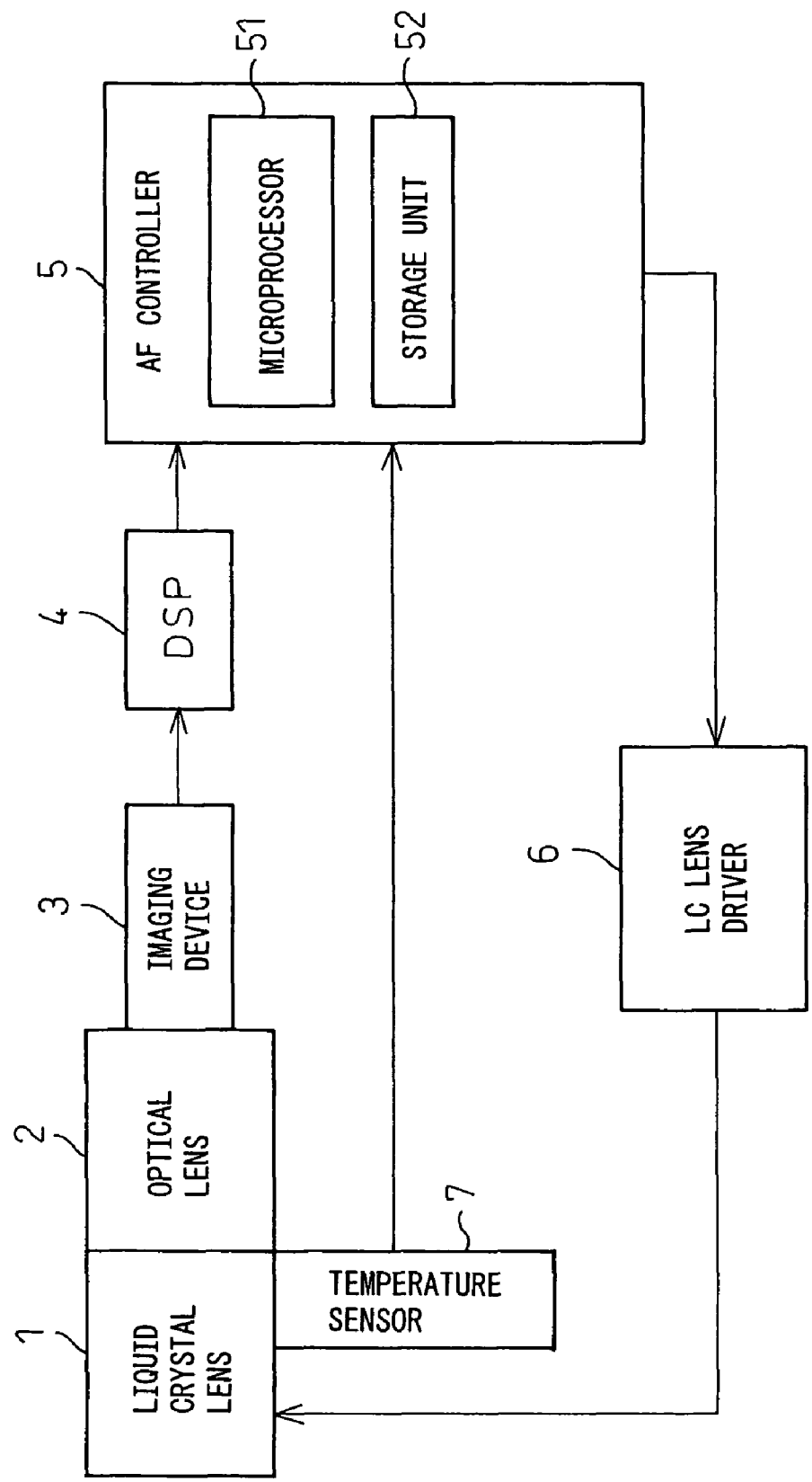
FIG. 13 is a block diagram showing the basic configuration of another automatic focusing apparatus according to the present invention.

FIG. 13 is a block diagram showing the basic configuration of another automatic focusing apparatus according to the present invention. The only difference from the automatic focusing apparatus shown in FIG. 1 is the inclusion of a temperature sensor 7. Otherwise, the configuration is the same as that of the automatic focusing apparatus shown in FIG. 1, and therefore, the description will not be repeated here.

The temperature sensor 7 detects the temperature near the liquid crystal lens 1, and sends a detection signal to the microprocessor 51. The microprocessor 51 can thus determine the temperature of the liquid crystal lens 1.

Figure 14:
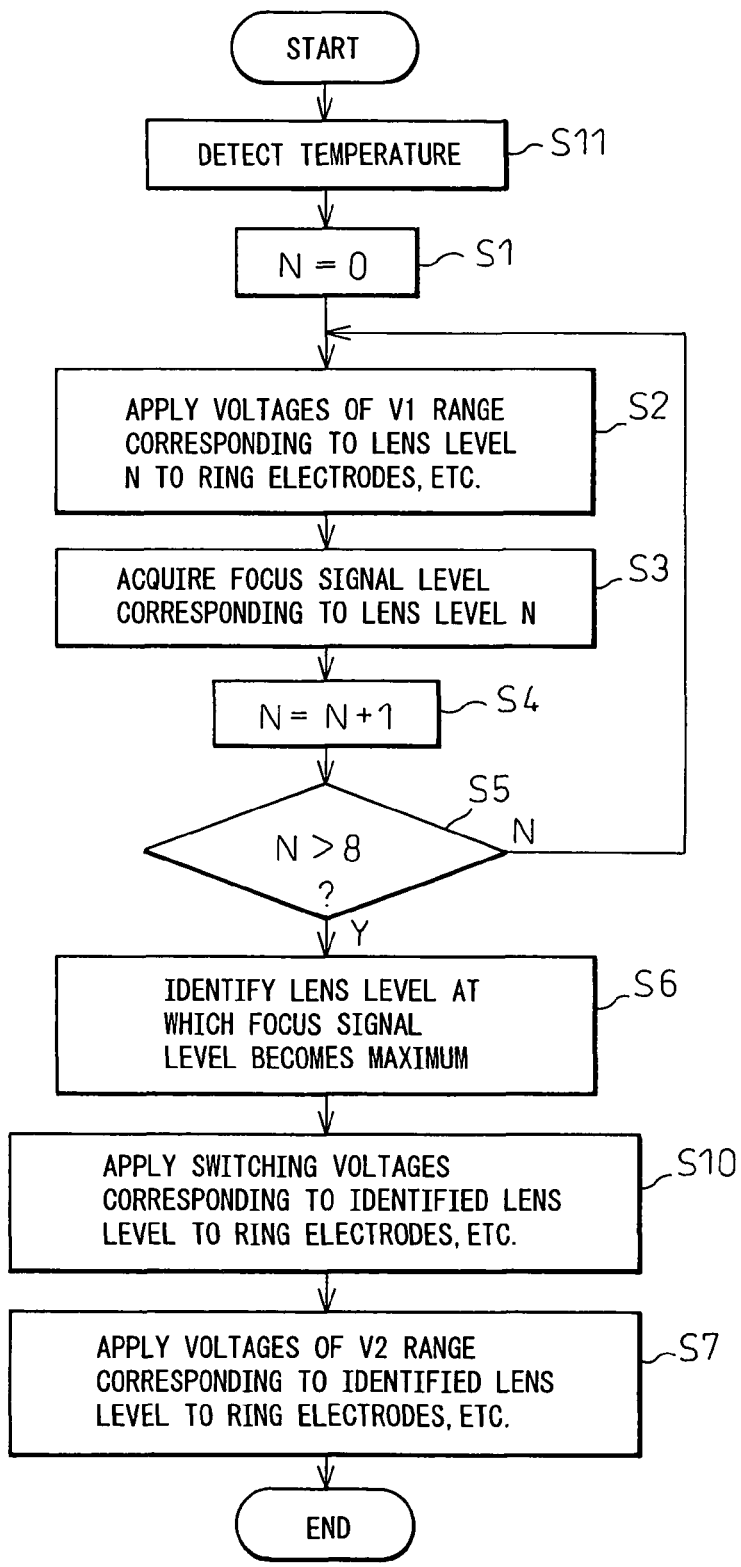
FIG. 14 is a diagram showing one example of the automatic focusing process flow performed in the automatic focusing apparatus shown in FIG. 13.

FIG. 14 is a diagram showing one example of the automatic focusing process flow performed in the automatic focusing apparatus shown in FIG. 13.

In the flow shown in FIG. 14, the microprocessor 51 performs the processing by cooperating with the various elements of the automatic focusing apparatus of the present invention in accordance with the programs prestored in the storage unit 52. The following flow is based on the earlier described scan method.

The only difference between the process flow shown in FIG. 14 and the process flow previously described with reference to FIG. 10 is that temperature information is acquired by detecting the temperature near the liquid crystal lens 1 before acquiring the focus signal levels for all the lens levels.

However, it should, be noted that the voltages in the "V1 range" applied in S2 when extracting the focus signal levels, the switching voltages applied in S10, and the voltages in the "V2 range" applied in S7 to achieve the identified lens level are all chosen in accordance with the temperature acquired in step S11. For this purpose, the voltages to be applied to the respective ring electrodes (1 to 20) are stored in advance in the storage unit 52 for every 5° C. temperature range between −20° C. and 60° C.

In the automatic focusing apparatus shown in FIG. 14, since the refractive index of the liquid crystal layer is temperature dependent, and the time required for the liquid crystal molecules to change to the stable state in response to the applied voltage is also temperature dependent, the temperature near the liquid crystal lens 1 is detected and the voltages applied to the liquid crystal layer are adjusted in accordance with the ambient temperature.

Figure 15:
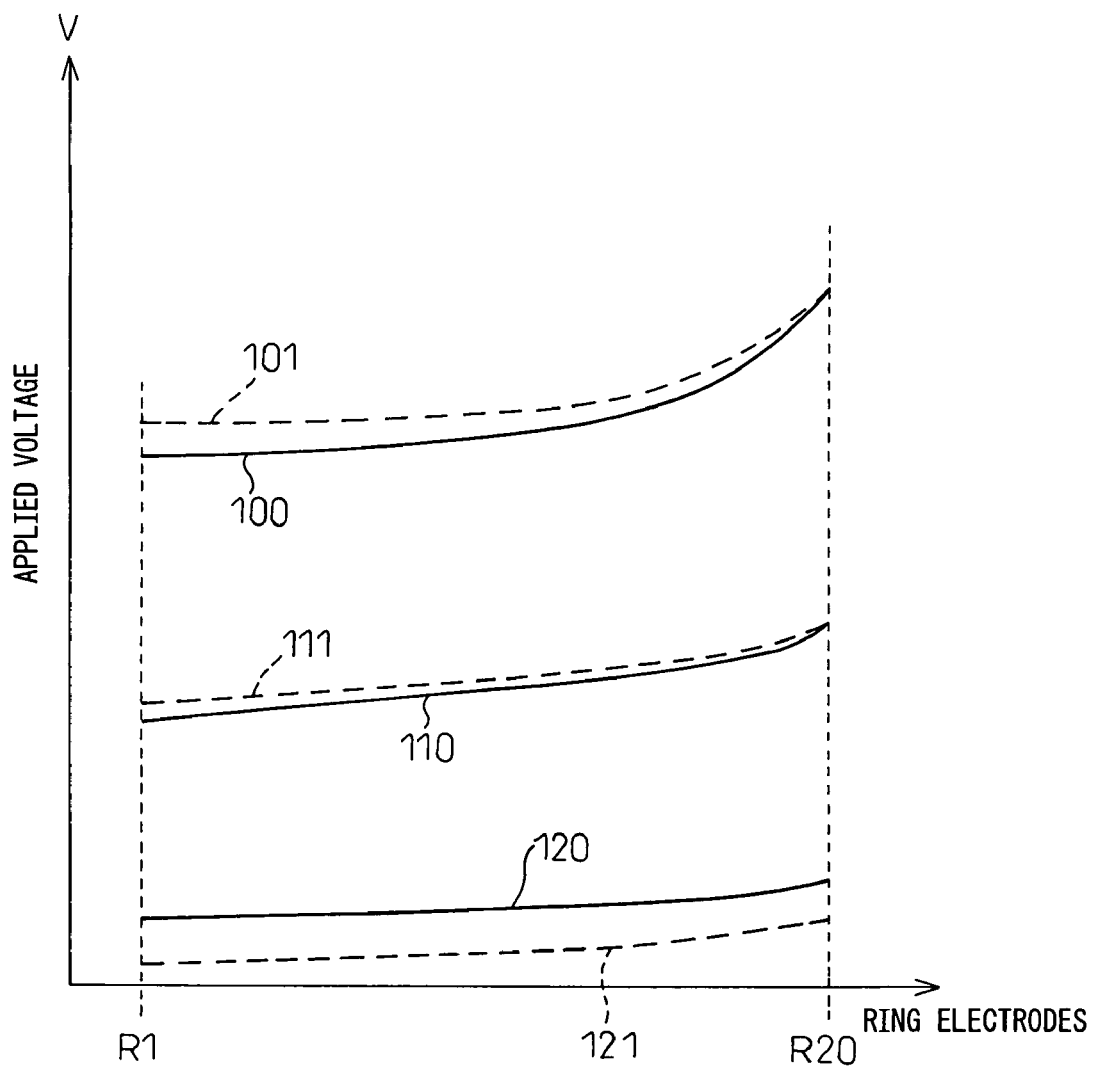
FIG. 15 is a diagram showing how the voltages applied to the respective ring electrodes are changed in the flow shown in FIG. 14.

FIG. 15 is a diagram showing how the voltages applied to the respective ring electrodes are changed in the flow shown in FIG. 14. In FIG. 15, the ordinate represents the applied voltage, and the abscissa represents the ring electrode position. R1 indicates the innermost ring electrode, and R20 the outermost ring electrode. Curves shown in FIG. 15 are each drawn by plotting the voltages applied to the respective ring electrodes (1 to 20) and joining the plotted points.

In FIG. 15, curve 100 represents the starting voltages (the voltages in the "V1 range" applied when the focus signal level corresponding to the last lens level was measured by the scan method) for 25° C., and curve 101 represents the starting voltages for −20° C. Likewise, curve 110 represents the target voltages (the voltages in the "V2 range" that match the determined lens level) for 25° C., and curve 111 represents the target voltages for −20° C. Further, curve 120 represents the switching voltages corresponding to the curves 100 and 110, while curve 121 represents the switching voltages corresponding to the curves 101 and 111. It will be noted here that since the response speed at −20° C. is slower than the response speed at 25° C., the response speed is improved by setting the switching voltages for −20° C. lower than the switching voltages for 25° C.

In FIGS. 14 and 15 also, under the control of the microprocessor 51, the LC driver 6 first changes the voltages applied to the respective ring electrodes from the starting voltages to the switching voltages and then changes the applied voltages from the switching voltages to the target voltages. In this way, in the process flow shown in FIG. 14 also, since provisions are made to apply the target voltages after applying the switching voltages whose potential difference relative to the starting voltages is greater than that of the target voltages, it is possible to reduce the time lag with which the liquid crystal molecules change to the stable state in response to the applied voltages.

For example, when there are 9 lens levels (lens levels 0 to 8) and 17 temperature levels (in increments of 5° C. in the range of −20° C. to 60° C.), then in the case of the scan method, 1×17=17 combinations of starting voltages (curves 100, etc.), 9×17=153 combinations of target voltages (curves 110, etc.), and 17×153=2601 combinations of switching voltages (curves 120, etc.) must be created and stored in advance in the storage unit 51. On the other hand, in the case of the hill climbing method, 9×17=153 combinations of starting voltages (curves 100, etc.), 9×17=153 combinations of target voltages (curves 110, etc.), and 153×153=23409 combinations of switching voltages (curves 120, etc.) must be created and stored in advance in the storage unit 51.

In the automatic focusing apparatus shown in FIGS. 1 and 13, the autofocus controller 5 and the liquid crystal lens driver 6, both separately provided from the liquid crystal lens 1, have been configured to function as the focus signal extracting unit, focusing point identifying unit, focusing point adjusting unit, and/or switching voltage application unit. However, a storage device such as a ROM may be incorporated in the liquid crystal lens driver 6, and only the liquid crystal lens driver 6 may be configured to function as the focus signal extracting unit, focusing point identifying unit, focusing point adjusting unit, and/or switching voltage application unit. In that case, the liquid crystal lens 1 and the liquid crystal lens driver 6 may be combined in one optical device, and may be configured so that the image signal from the imaging device 3 separately provided from the optical device is directly input to the liquid crystal lens driver 6.

In the automatic focusing apparatus shown in FIGS. 1 and 13, the optical lens 2 cooperating with the liquid crystal lens 1 has been provided, but the optical lens 2 is not an essential component and may be omitted depending on the purpose.

As described above, the automatic focusing apparatus according to the present invention is advantageous for use in apparatus having an autofocus function, and is particularly suited to implement an autofocus function in film cameras, digital cameras, movie cameras, cameras built into mobile phones, cameras mounted on vehicles or the like for rear view monitoring, cameras adapted for use in endoscopes, eyewear having a function for varying the power of the lens, etc.

What is claimed is:

1. An automatic focusing apparatus comprising:
a liquid crystal lens which forms a refractive index profile;
an optical-to-electrical conversion unit which converts an optical image focused through said liquid crystal lens into an electrical signal and outputs said electrical signal as an image signal;
a focus signal extracting unit which causes said refractive index profile to change by applying a first range of voltage to said liquid crystal lens, and extracts a plurality of focus signals based on said image signal;
a focusing point identifying unit which identifies a focus signal corresponding to a focusing point from among said plurality of extracted focus signals;
a focusing point adjusting unit which adjusts the focusing point by applying to said liquid crystal lens a second voltage that is capable of generating the refractive index profile corresponding to the focus signal identified by said focusing point identifying unit and that is smaller than said first range of voltage applied to said liquid crystal lens in order to obtain the focus signal identified by said focusing point identifying unit; and
a storage unit which stores said first range of voltage and said second voltage corresponding to each individual voltage in said first range of voltage by establishing an association therebetween.

2. The automatic focusing apparatus according to claim 1, wherein said first range of voltage includes a plurality of voltages prespecified for each preset focal length.

3. The automatic focusing apparatus according to claim 2, wherein said focus signal extracting unit acquires said focus signal for every preset focal length.

4. The automatic focusing apparatus according to claim 2, wherein said focus signal extracting unit compares a previously detected focus signal corresponding to a first focal length with a currently detected focus signal corresponding to a second focal length to check whether said focus signal has increased or decreased, and then proceeds to extract a focus signal corresponding to a third focal length, thereby successively comparing one focus signal with the next, and when the focus signal corresponding to said focusing point is identified by said focusing point identifying unit, the extraction of said focus signals is stopped.

5. The automatic focusing apparatus according to claim 1, further comprising a temperature detection unit for detecting temperature near said liquid crystal lens.

6. The automatic focusing apparatus according to claim 5, wherein said focus signal extracting unit causes said refractive index profile to change by applying said first range of voltage to said liquid crystal lens based on the temperature detected by said temperature detection unit, and extracts said plurality of focus signals based on said image signal, and said focusing point adjusting unit, based on the temperature detected by said temperature detection unit, applies to said liquid crystal lens said second voltage that is capable of generating the refractive index profile corresponding to the focus signal identified by said focusing point identifying unit and that is smaller than said first range of voltage applied to said liquid crystal lens in order to obtain the focus signal identified by said focusing point identifying unit.

7. The automatic focusing apparatus according to claim 6, wherein said storage unit stores said first range of voltage and said second voltage corresponding to each individual voltage in said first range of voltage by establishing an association therebetween for each designated temperature.

8. The automatic focusing apparatus according to claim 1, wherein said liquid crystal lens comprises a plurality of ring-shaped zones and a liquid crystal layer.

9. The automatic focusing apparatus according to claim 1, further comprising an optical lens cooperating with said liquid crystal lens.

10. An automatic focusing apparatus comprising;
a liquid crystal lens which forms a refractive index profile;
an optical-to-electrical conversion unit which converts an optical image focused through said liquid crystal lens into an electrical signal and outputs said electrical signal as an image signal;
a focus signal extracting unit which causes said refractive index profile to change by applying a first range of voltage to said liquid crystal lens, and extracts a plurality of focus signals based on said image signal;
a focusing point identifying unit which identifies a focus signal corresponding to a focusing point from among said plurality of extracted focus signals;
a focusing point adjusting unit which adjusts the focusing point by applying to said liquid crystal lens a second voltage that is capable of generating the refractive index profile corresponding to the focus signal identified by said focusing point identifying unit and that is smaller than said first range of voltage applied to said liquid crystal lens in order to obtain the focus signal identified by said focusing point identifying unit; and a switching voltage applying unit which, prior to applying said second voltage, applies to said liquid crystal lens a switching voltage whose potential difference relative to said first range of voltage is greater than said second voltage.

11. The automatic focusing apparatus according to claim 10, further comprising a storage unit which stores said first range of voltage and said second voltage corresponding to each individual voltage in said first range of voltage by establishing an association therebetween, wherein said storage unit stores said first range of voltage, said second voltage corresponding to each individual voltage in said first range of voltage, and said switching voltage corresponding to said each individual voltage in said first range of voltage and to said second voltage by establishing an association therebetween.

12. The automatic focusing apparatus according to claim 10, further comprising a temperature detection unit for detecting temperature near said liquid crystal lens.

13. The automatic focusing apparatus according to claim 12, wherein said focus signal extracting unit causes said refractive index profile to change by applying said first range of voltage to said liquid crystal lens based on the temperature detected by said temperature detection unit, and extracts said plurality of focus signals based on said image signal, said focusing point adjusting unit, based on the temperature detected by said temperature detection unit, applies to said liquid crystal lens said second voltage that is capable of generating the refractive index profile corresponding to the focus signal identified by said focusing point identifying unit and that is smaller than said first range of voltage applied to said liquid crystal lens in order to obtain the focus signal identified by said focusing point identifying unit, and prior to the application of said second voltage, said switching voltage applying unit, based on the temperature detected by the temperature detection unit, applies to said liquid crystal lens said switching voltage whose potential difference relative to said first range of voltage is greater than said second voltage.

14. The automatic focusing apparatus according to claim 13, further comprising a storage unit which stores said first range of voltage and said second voltage corresponding to each individual voltage in said first range of voltage by establishing an association therebetween, wherein said storage unit stores said first range of voltage, said second voltage corresponding to each individual voltage in said first range of voltage, and said switching voltage corresponding to said each individual voltage in said first range of voltage and to said second voltage by establishing an association therebetween for each designated temperature.

* * * * *